(12) United States Patent
Momonoi et al.

(10) Patent No.: US 9,521,372 B2
(45) Date of Patent: Dec. 13, 2016

(54) PATTERN MEASURING APPARATUS, PATTERN MEASURING METHOD, AND COMPUTER-READABLE RECORDING MEDIUM ON WHICH A PATTERN MEASURING PROGRAM IS RECORDED

(71) Applicant: Hitachi High-Technologies Corporation, Minato-ku, Tokyo (JP)

(72) Inventors: Yoshinori Momonoi, Tachikawa (JP); Koichi Hamada, Kawasaki (JP); Yuji Takagi, Kamakura (JP); Michio Hatano, Tokyo (JP); Hideyuki Kazumi, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 831 days.

(21) Appl. No.: 13/898,620

(22) Filed: May 21, 2013

(65) Prior Publication Data

US 2013/0321610 A1 Dec. 5, 2013

(30) Foreign Application Priority Data

May 21, 2012 (JP) ................................. 2012-115295

(51) Int. Cl.
*H04N 7/18* (2006.01)
*G06T 7/00* (2006.01)

(52) U.S. Cl.
CPC .............. *H04N 7/18* (2013.01); *G06T 7/0006* (2013.01); *G06T 2207/10016* (2013.01); *G06T 2207/10061* (2013.01); *G06T 2207/30148* (2013.01)

(58) Field of Classification Search
CPC ........................................................ H04N 7/18
(Continued)

(56) References Cited

U.S. PATENT DOCUMENTS 5,512,747 A * 4/1996 Maeda ..................... H01J 37/21
250/310
6,067,164 A * 5/2000 Onoguchi ............. H01J 37/265
250/310

(Continued)

FOREIGN PATENT DOCUMENTS

JP 07-027549 A 1/1995
JP 2004-140280 A 5/2004

(Continued)

*Primary Examiner* — Dave Czekaj
*Assistant Examiner* — Shanika Brumfield
(74) *Attorney, Agent, or Firm* — Miles & Stockbridge P.C.

(57) ABSTRACT

There is provided a technique to correctly select and measure a pattern to be measured even when contours of the pattern are close to each other in a sample including a plurality of patterns on a substantially same plane.

A pattern measuring apparatus that scans a sample with charged particles, forms a detected image by detecting secondary charged particles or backscattered charged particles generated from the sample, and measures a pattern imaged on the detected image includes: an image acquiring section acquiring a plurality of detected images taken at a substantially same location on the sample under different imaging conditions; a contour extracting section extracting a plurality of pattern contours from the plurality of detected images; a contour reconstructing section reconstructing a contour to be measured by combining the plurality of pattern contours; and a contour measuring section making a measurement using the reconstructed contour to be measured.

19 Claims, 17 Drawing Sheets

(58) Field of Classification Search
USPC .......................................................... 348/80
See application file for complete search history.

(56) References Cited

U.S. PATENT DOCUMENTS

| | | | |
|---|---|---|---|
| 6,538,249 B1 * | 3/2003 | Takane | G06T 5/50 |
| | | | 850/10 |
| 2004/0131246 A1 * | 7/2004 | Ikeda | G06T 7/0004 |
| | | | 382/145 |

FOREIGN PATENT DOCUMENTS

| | | | |
|---|---|---|---|
| JP | 2009-110969 A | | 1/2009 |
| JP | 2013088415 A | * | 5/2013 |

* cited by examiner

1−2    1+2

PATTERN MEASURING APPARATUS, PATTERN MEASURING METHOD, AND COMPUTER-READABLE RECORDING MEDIUM ON WHICH A PATTERN MEASURING PROGRAM IS RECORDED

CLAIM OF PRIORITY

The present application claims priority from Japanese patent application JP 2012-115295 on May 21, 2012, the content of which is hereby incorporated by reference into this application.

BACKGROUND OF THE INVENTION

1. Field of the Invention

The present invention relates to a measuring apparatus and a measuring method for measuring a dimension of a micropattern formed on a sample using an electron microscope.

2. Description of the Related Art

In a manufacturing process of a semiconductor device in which multiple layers of microscopic circuit patterns are formed, measurements are made to see if the pattern is processed as designed, or if there is any variation in the pattern dimension. For this pattern measurement, a scanning electron microscope (SEM) suitable for dimensional measurement of the micropattern is widely used. The SEM irradiates a measurement sample with an electron beam while scanning and detects a signal electron (secondary electron and backsattered electron) secondarily obtained from the measurement sample, thereby obtaining a scanned image (SEM image). Because a generated amount of the secondarily obtained signal electron depends on a pattern shape, a material, and the like, the measuring target pattern can be measured using a contrast of the SEM image. The measuring apparatus and the measuring method using the electron microscope are disclosed in, for example, Japanese Unexamined Patent Publication Nos. 2004-140280, H07-27549, and 2009-110969.

SUMMARY OF THE INVENTION

The semiconductor device is generally constituted by a plurality of layers, and during its manufacturing process, patterns of both an upper layer and a lower layer may be simultaneously taken into an SEM image. For example, it is applicable when a part of the upper layer is removed by etching or the like and the lower layer is exposed. In this case, in addition to the upper layer, the exposed lower layer is also irradiated with the electron beam, and therefore the SEM image includes the patterns of both the upper layer and the exposed lower layer. When the patterns of both the upper layer and the lower layer are mixed in the SEM image, there are such advantages that the upper layer and the lower layer can be measured simultaneously, that a position shift between the upper layer and the lower layer can be measured, and so on.

However, mixture of the patterns of both the upper layer and the lower layer in the SEM image may interfere with a correct measurement. When the upper layer pattern is to be measured, if a contour of the lower layer pattern is close to the contour of the upper layer pattern, the pattern contour to be measured may be mistaken. For example, an explanation is given taking an example of a measurement of a hole pattern in which a lower layer wiring may be visible through a hole opening as a line pattern. FIGS. 1 and 2 show an exemplary case in which the upper layer includes a hole pattern and the lower layer includes a line pattern. A part of the line pattern 11 is exposed through the hole opening 10. In FIG. 1, a part of the contour 11a of the line pattern is visible inside the hole opening contour 10. In this case, when measuring the hole opening contour 10, the line pattern contour 11a may be incorrectly taken as a measuring object. Moreover, the way the line pattern 11 looks may possibly change. In FIG. 2, both contours 11a, 11b of the line pattern are visible in the hole opening. Thus, when a contour extraction is performed assuming that a contour on only one side of the lower layer wiring is exposed as shown in FIG. 1, the contour to be measured may possibly be mistaken. Such a difference in the way the wiring looks cannot necessarily be anticipated from a pattern design because it can also be caused by a process variation such as a dimensional variation of the hole or the lower layer wiring and misalignment between the upper layer and the lower layer.

There is an increased demand for eliminating a misjudge of the contour with miniaturization of recent semiconductor device. It is because miniaturization has advanced too much to allow extra room for the design dimension which used to be able to have extra room, and therefore the process variation easily becomes obvious. For example, in FIG. 1, it can be inhibited that the contour of the lower wiring reaches into the hole due to the process variation by making the wiring below the hole thicker than the hole diameter. However, in recent semiconductor devices, the linewidth and the hole diameter are often equal, and therefore the wiring contour may or may not be visible in the hole depending on the process variation.

Furthermore, there is proposed a method of simultaneously measuring the patterns on the upper layer and the lower layer as the process variation becomes apparent. For example, there is a demand for measuring a misalignment between the upper layer and the lower layer, or measuring the upper layer pattern above a specific pattern on the lower layer. One example of the latter may be measuring a gate electron on a channel region that is most significant for a property of a transistor with a sample of the transistor after processing the gate electron thereon.

Meanwhile, with the miniaturization of the semiconductor device, it has become more difficult to determine the contour using the SEM. This is because the contours as close to each other as a few nm or less, which is equivalent to the resolution of the SEM, must be identified. In general, the SEM determines the contour of the pattern based on a brightness change in the signal electron. However, when the pattern contours get as close to each other as a few nm, the brightness changes overlap and it is difficult to determine from which contour the change derives. Furthermore, the measurement may also be difficult due to the miniaturization of the semiconductor device when measuring the upper layer and the lower layer at the same time. This is because a distance between one pattern and another, and thus the contour extraction on each of the upper layer and the lower layer, tends to be interfered with by the contour of the pattern on the other layer.

Japanese Unexamined Patent Publication No. 2004-140280 discloses a method of correctly identifying and measuring the patterns on each layer when the SEM image includes patterns on a plurality of layers. The contour is correctly determined for the measurement by extracting the contours of the patterns from the SEM image and grouping the contours. However, as described above, close contours make it difficult to extract the plurality of contours to be identified, per se. Accordingly, this technique cannot identify close contours.

Japanese Unexamined Patent Publication No. H07-27549 discloses a method of measuring the patterns on the upper layer and the lower layer by changing a condition of emitting an electron beam. According to Japanese Unexamined Patent Publication No. H07-27549, it is possible to measure a structure embedded in the sample by emitting the electron beam having energy sufficient to reach an unexposed portion. Furthermore, it is possible to acquire a plurality of SEM images using a plurality of irradiation conditions with different depth of the sample the electron beam can reach and a plurality of irradiation conditions with different incident angle, and assess a three-dimensional shape using the plurality of SEM images. Moreover, there is also proposed a method of performing an image operation such as stacking images at different depths and generating an image formed by brightness differences among the SEM images.

However, these techniques cannot perform the measurement by identifying the close contours on the upper layer and the lower layer. With the method of assessing the three-dimensional shape by stacking the SEM images at different depths, it is possible to distinguish between patterns at sufficiently different depth from the surface. However, for the patterns present on a substantially same plane, the effect is same as that of the conventional measurement using the SEM image. In general, when measuring the upper layer and the lower layer at the same time, an interface between the upper layer and the lower layer is focused on. This is because a difference of the wiring or the device structure between the upper layer and the lower layer often influences the performance and the yield of the semiconductor device. Therefore, the contours of the patterns on the upper layer and the lower layer to be measured are often present on the substantially same plane. For example, in FIG. 1, the hole bottom contour 10 and the contours 11a, 11b of the lower layer wiring exposed through the hole opening are present on the substantially same plane as the interface between the upper layer and the lower layer. Furthermore, it is not possible to identify the close contours only by generating the image for measurement by performing the image operation such as generating a differential image based on the brightness difference among images. Close contours have overlapping brightness changes and are obscure. Thus, the images acquired by these image operations have larger errors in the operations, and it is difficult to determine whether the contour is actually the measuring object or it was incidentally generated by operating the mutually obscure brightness change. In addition, it is not possible to acquire a plurality of SEM images at the same time because the imaging conditions may vary. When the imaging does not take place simultaneously, the imaging position may shift even when the sample position is not intentionally changed. This is partly because the sample moves due to vibration or thermal vibration, and partly because the point of irradiation by the electron beam is shifted due to change in a charged state of the sample. These techniques therefore cannot identify or measure the contours as close as a few nm.

Japanese Unexamined Patent Publication No. 2009-110969 discloses a technique of acquiring the SEM image for measurement by acquiring the SEM images of a single measuring object under a plurality of imaging conditions and combining these images. Japanese Unexamined Patent Publication No. 2009-110969 discloses the technique of acquiring a plurality of images with the focal position being changed with respect to the hole pattern and synthesizing an image brought into focus at both the top and the bottom of the hole. These techniques cannot eliminate a possibility of incorrectly measuring an adjacent contour as in the past when there are close contours in the substantially same plane. This is because, for example, measurement of the hole bottom does not require an image of the hole top and it would be difficult to identify the contour of the hole bottom in the synthetic image of the top and bottom.

It is an object of the present invention to provide a pattern measuring apparatus, a pattern measuring method, and a pattern measuring program capable of correctly selecting and measuring the pattern contour to be measured even when the pattern contours are close to one another in the sample including a plurality of patterns.

In order to achieve the above object, the present invention includes the configuration described in the appended claims.

One example of the pattern measuring apparatus according to the invention is a pattern measuring apparatus that scans a sample with charged particles, forms a detected image by detecting secondary charged particles or backscattered charged particles generated from the sample, and measures a pattern imaged on the detected image, the apparatus including: an image acquiring section acquiring a plurality of detected images taken at a substantially same location on the sample under different imaging conditions; a contour extracting section extracting a plurality of pattern contours from the plurality of detected images; a contour reconstructing section reconstructing a contour to be measured by combining the plurality of pattern contours; and a contour measuring section making a measurement using the reconstructed contour to be measured.

One example of the pattern measuring method according to the invention is a pattern measuring method of scanning a sample with charged particles, forming a detected image by detecting secondary charged particles or backscattered charged particles generated from the sample, and measuring a pattern imaged on the detected image, the method including the steps of: acquiring a plurality of detected images taken at a substantially same location on the sample under different imaging conditions; extracting a plurality of pattern contours from the plurality of detected images; reconstructing a contour to be measured by combining the plurality of pattern contours; and making a measurement using the reconstructed contour to be measured.

One example of the pattern measuring program according to the invention is a program causing a computer to measure a pattern imaged on a detected image acquired by a charged particle beam device, the program causing the computer to: acquire a plurality of detected images taken at a substantially same location on the sample under different imaging conditions; extract a plurality of pattern contours from the plurality of detected images; reconstruct a contour to be measured by combining the plurality of pattern contours; and make a measurement using the reconstructed contour to be measured.

The invention makes it possible to correctly select and measure the pattern contour to be measured even when the pattern contours are close to one another in the sample including a plurality of patterns.

DETAILED DESCRIPTION OF THE INVENTION

Hereinafter, embodiments of the present invention will be described with reference to drawings. Generally two different embodiments to carry out the invention will be given below. A first embodiment uses a novel SEM capable of carrying out the invention. In a second embodiment, an image is acquired by a conventional SEM, and then measurement is performed using a pattern measuring program capable of carrying out the invention.

According to the first embodiment, the SEM can collectively control an imaging condition of the SEM image, a control extracting method, and a pattern measuring method. This provides advantages of reducing the total processing time and easy operation of parameter setting and the like. On the other hand, according to the second embodiment, the effect of the present invention can be obtained at a lower cost compared with the first embodiment because the conventional SEM can be used.

First Embodiment

Figure 4:
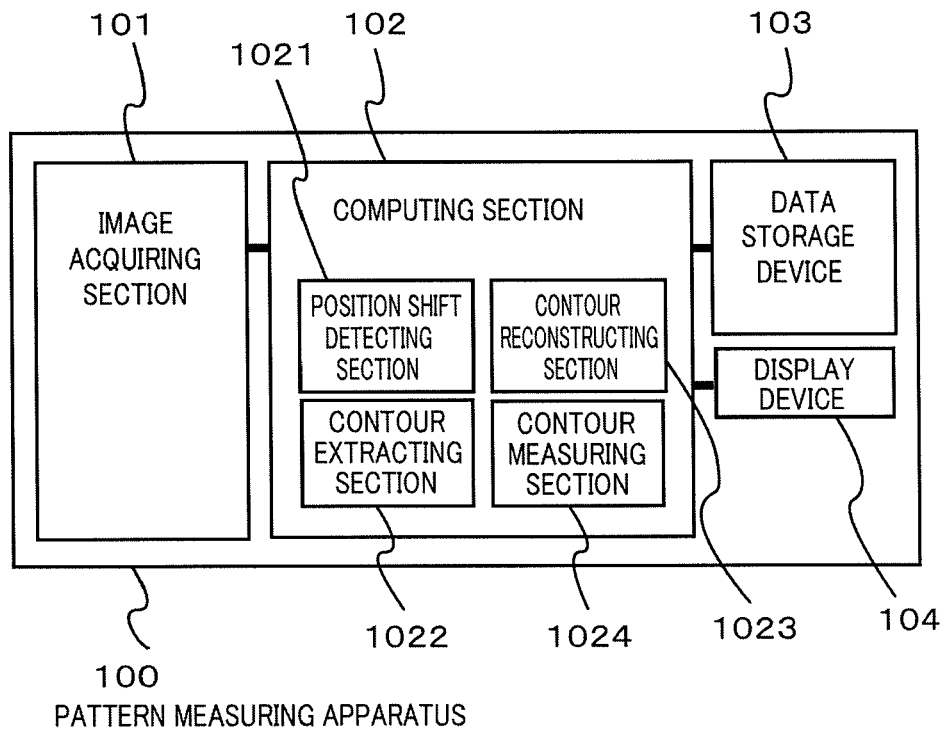
FIG. 4 is a block diagram of a pattern measuring apparatus according to the first embodiment.

FIG. 4 shows a block diagram of a pattern measuring apparatus according to the first embodiment. The pattern measuring apparatus 100 used in this embodiment includes an image acquiring section 101, a computing section 102, a data storage device 103, and a display device 104. The image acquiring section 101 may be configured to acquire an SEM image, which has, for example, the same configuration as a critical dimension scanning electron microscope (CD-SEM). A device control parameter and a data processing parameter for imaging and measuring a sample to be measured are stored in the data storage device 102 as a wafer measurement recipe. The wafer measurement recipe includes a position of a pattern to be measured, a reference image and data required for performing a pattern matching to place a measuring object in an imaging range, a setting condition of an electron beam and the like required for the imaging, a method of measuring the pattern, a data processing condition required for measuring the pattern, and the like. The computing section 102 is constituted by a computer which controls an operation of each section and measures the SEM image taken. The computing section 102 includes a position shift detecting section 1021, a contour extracting section 1022, a contour reconstructing section 1023, and a contour measuring section 1024. Upon start of the measurement, the computing section 102 reads the wafer measurement recipe from the data storage device 103, and provides the image acquiring section 101 with a sample positioning parameter required for acquiring an image of the pattern to be measured and a control parameter required for taking the image. The image acquiring section 101 acquires the image, and returns the acquired image to the computing section 102. The computing section 102 performs an image processing and a measurement of the pattern shape upon the received image as specified by the wafer measurement recipe. The position shift detecting section 1021, the contour extracting section 1022, the contour reconstructing section 1023, and the contour measuring section 1024 are used to measure the pattern shape. Furthermore, the data storage device 103 stores therein the image and the result of the pattern measurement. The computing section 102 displays a series of the process on the display device 104 as needed.

Figure 5:
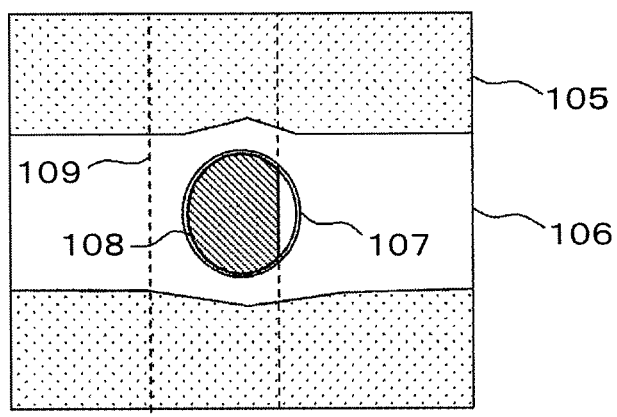
FIG. 5 is a schematic diagram illustrating the sample to be measured according to the first embodiment.

An explanation is given below about the sample to be measured according to the first embodiment with reference to FIG. 5. The sample to be measured according to the embodiment is in the middle of creating multilayer wiring on a semiconductor device. FIG. 5 schematically shows an example of the SEM image acquired from the sample to be measured. From FIG. 5, three different patterns can be seen in the SEM image of the sample to be measured. Specifically, the patterns are a trench pattern 106, a hole pattern 107 processed inside the trench pattern 106, and a lower layer wiring pattern 108 inside the hole pattern 107. Denoted by 105 is a mask film. To explain the laminated structure, the trench pattern 106 is on the outermost surface, and the hole pattern 107 is processed on the bottom of the trench pattern 106. Formed below the hole pattern 107 is the lower layer wiring pattern 108. The trench pattern 106 and the hole pattern 107 are hollow patterns with only the shapes are processed, while the lower layer wiring pattern 108 includes metal embedded therein.

The lower layer wiring pattern 108 in FIG. 5 is a part of a metal line 109 exposed by processing the trench pattern 106 and the hole pattern 107. In addition, a contour on the right side of the lower layer wiring pattern 108 is seen within the hole pattern 107 in FIG. 5. This is because the lower layer wiring pattern 108 and the hole pattern 107 are formed with their positions being shifted. The shift may vary due to the manufacturing process. For example, if the center of the metal wiring 109 is made to coincide with the center of the hole pattern 107, the metal wiring occupies the entire bottom face of the hole pattern 107, showing no contour of the metal wiring in the hole.

According to the embodiment, a diameter of the hole pattern 107 and an area of the lower layer wiring pattern 108 exposed in the hole, shown in FIG. 5, are to be measured. Note that the invention is not limited to the case in which the pattern is exposed to the surface. One or both of a plurality of patterns may be embedded in the sample.

A pattern measuring procedure of the embodiment will be described below. According to the embodiment, two SEM images are acquired using two different imaging conditions (first imaging condition and second imaging condition) with respect to each measuring location. When the sample includes a plurality of measuring locations, two different procedures are conceivable. The first procedure is, after positioning the sample so as to acquire the SEM image of the measuring location, to acquire the images under the first imaging condition and the second imaging condition continuously. The second procedure is to acquire the SEM images at all the measuring locations on the sample under the first imaging condition and then to acquire the SEM images at all the measuring locations on the sample under the second imaging condition. With the first procedure, the sample positioning needs to be performed only once, but the state of the device may not be stable because the imaging condition must be changed in a short time. With the second procedure, the measuring time is extended because the sample positioning is performed under the first imaging condition and the second imaging condition, respectively. However, because the imaging condition is changed only once, it is easier to stabilize the state of the SEM device. The present embodiment uses the latter procedure in which the SEM images are acquired at all locations on the sample under the first imaging condition and then the SEM images at all the measuring locations on the sample are acquired under the second imaging condition.

Figure 1:
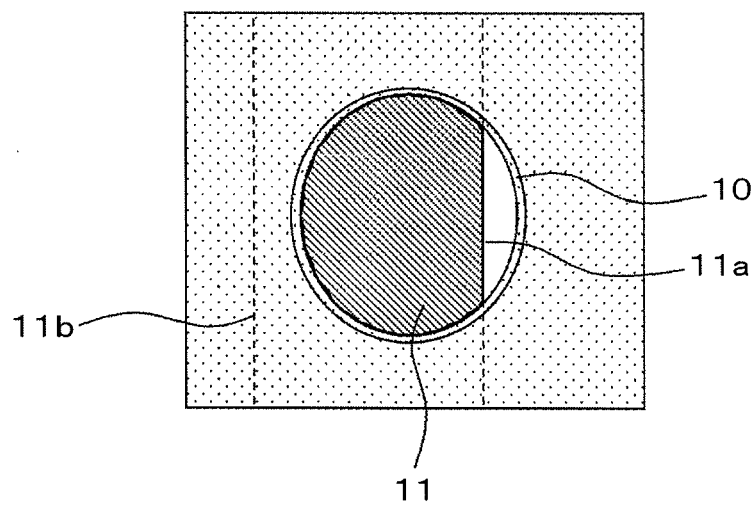
FIG. 1 shows an example of an SEM image of a sample including a hole pattern on an upper layer and a line pattern on a lower layer.
Figure 2:
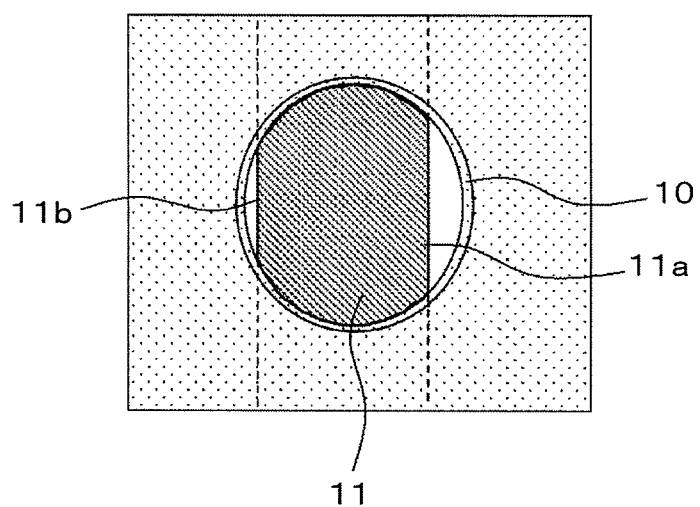
FIG. 2 shows another example of the SEM image of the sample in which the upper layer has the hole pattern and the lower layer has the line pattern.
Figure 3:
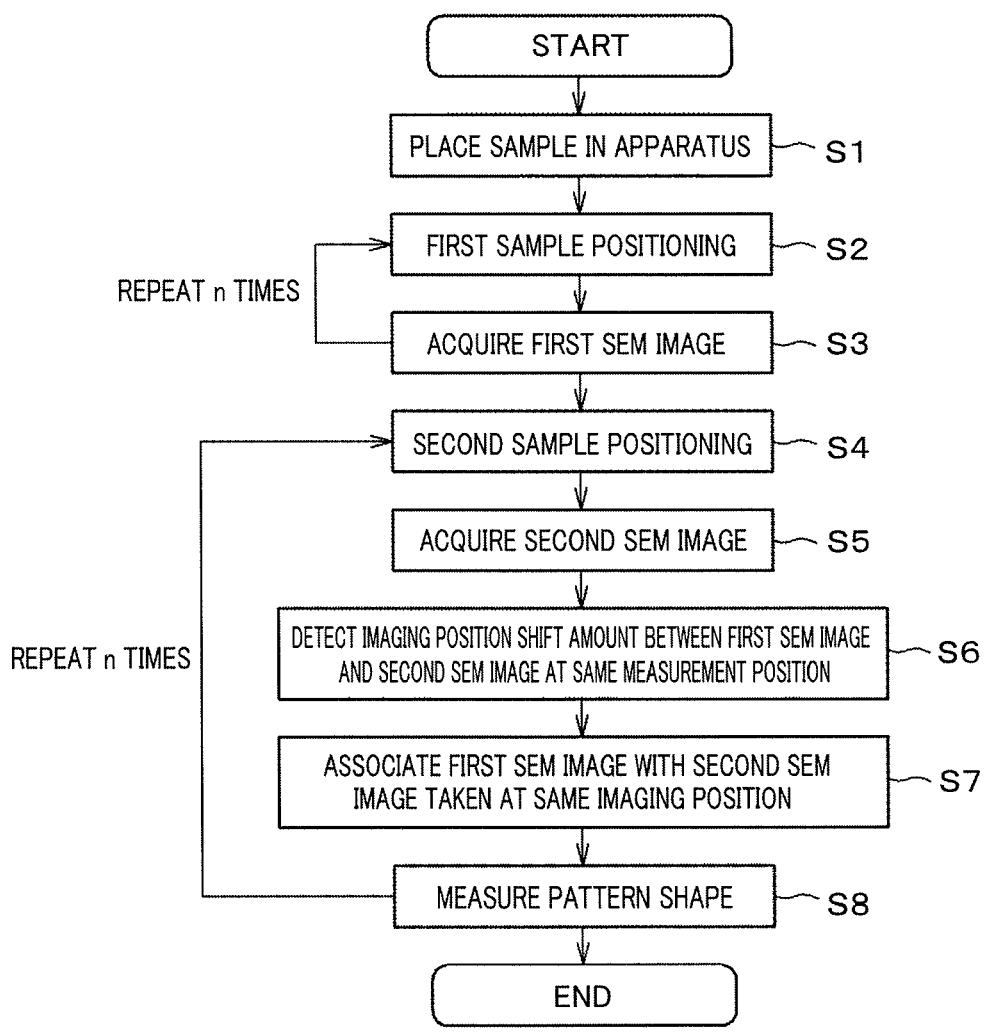
FIG. 3 is a flowchart illustrating contents of a pattern measurement according to a first embodiment of the invention.

With reference to FIG. 3, an outline of the flow of the pattern measurement according to the first embodiment is described below. Details of each step will be described later. First, the sample is placed in the apparatus (Step S1). Next, the SEM images at all measuring locations on the sample are taken under the first imaging condition. To adjust the sample position and the irradiation area of the electron beam so as to include the measuring object in the imaging area, the first sample positioning is performed (Step S2). The first SEM image is acquired under the first imaging condition and stored in the data storage device 103 (Step S3). Step S2 and Step S3 are repeated at each measuring locations on the sample. Next, the SEM images at all measuring locations on the sample are taken under the second imaging condition. The second sample positioning (Step S4) and an acquisition of the second SEM image under the second imaging condition (Step S5) are performed. Next, a position shift amount of imaging positions is detected between the first SEM image and the second SEM image taken at the same measuring location (Step S6). The first SEM image and the second SEM image are associated with each other with respect to each measuring location on the sample (Step S7). To associate them herein means to store in the data storage device 103 the data from which the first and second SEM images taken at the same imaging location as well as the position shift amount of the imaging positions between both SEM images can be easily read. Subsequently, the pattern shape is measured using the first SEM image and the second SEM image (Step S8). Steps S4 to S8 are repeated for n measuring locations present on the sample before completion. It should be noted that the invention is not limited to the order of the measuring procedure described above. For example, the steps can be performed in parallel to increase the measuring speed. For example, among the steps shown in FIG. 3, Step S4 and Step S5 may be repeated by the image acquiring section 101 while Step S6 and Step S7 are repeated by the computing section 102.

A parameter required for advancing from Step S1 to Step S8 in FIG. 3 is generated in advance as a wafer measurement recipe. Thus, by causing the computing section 102 to execute the wafer measurement recipe after the sample is placed in the apparatus at Step S1, Steps S1 to S8 can be automatically performed.

Next, the first imaging condition and the second imaging condition are explained. The imaging condition herein refers to, for example, incident energy and electric current of the electron beam input to the sample, an angle at which the electron beam enters the sample, a tip diameter of the electron beam and an angle of aperture of the beam, a scanning speed, a scanning order, and a scanning direction of the electron beam, extraction voltage applied in a direction in which a signal electron is extracted from the sample surface, and the like. By changing the incident energy and the incident angle of the electron beam, the depth of the sample that the electron beam reaches can be changed. For example, the larger the incident energy is, or the more vertical to the sample the incident angle is, the deeper the electron beam can enter the sample. This makes it possible to measure the pattern not exposed to the surface but embedded in the sample. On the other hand, under an opposite condition, it is easier to measure the pattern on the sample surface. It is also possible to emphasize a secondary electron image apt to reflect the shape of the sample by reducing the incident energy of the electron beam and to emphasize a backscattered electron image apt to reflect the material of the sample by increasing the incident energy. Using a narrow beam by reducing the angle of aperture of the electron beam, the electron beam can pass through a gap between finer patterns to reach the bottom of the pattern. On the contrary, using a wider beam with a larger angle of aperture, the beam cannot enter the gap between fine patterns, thereby easily measuring the pattern on the sample surface. Moreover, the current of the electron beam, the scanning speed of the electron beam, the scanning order, and the aforementioned extraction voltage can change the charged state of the sample. This is because these parameters can control an amount of electrons entering the sample and an amount of electrons extracted from the sample.

When the charged state is changed on the sample surface and at the bottom of the pattern, a potential between the sample surface and the pattern bottom changes, making it possible to suppress or emphasize the secondary electron generated at the bottom of the pattern. As a means for changing the charged state of the sample surface, a predose would be also useful in which the electron beam is emitted before acquiring the image for the measurement. The charged state of the sample depends not only on the method of emitting the electron beam but also on the material, the laminated structure, and the processed pattern structure of the sample. Therefore, the above parameters are adjusted so as to acquire the desired SEM image depending on the measuring object.

The first imaging condition is set for an easy measurement of the hole pattern shape to be measured and also for imaging the trench pattern on the sample surface. The second imaging condition is set for an easy measurement of the metal wiring pattern below the hole pattern and also for imaging the trench pattern on the sample surface. In this embodiment, the first imaging condition employs 500 V incident energy of the electron beam, 2 pA current, and a high scanning speed. In addition, flat scanning is used as the electron beam scanning procedure. The flat scanning herein means to scan discretely in any given direction with respect to each coordinate point. This imaging condition emphasizes the secondary electron image and thus can image the first SEM image suitable for measuring the hole shape.

Figure 6:
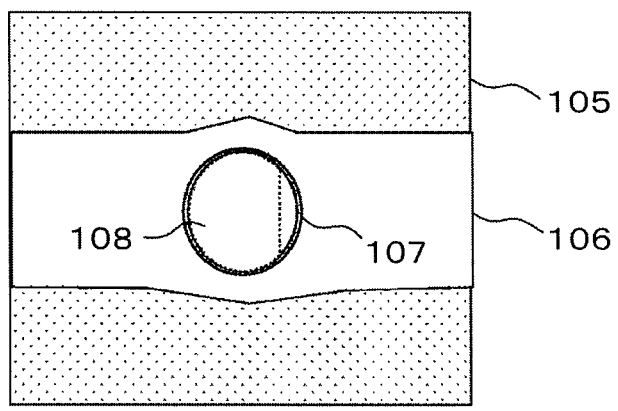
FIG. 6 shows an example of the SEM image of the sample to be measured according to the first embodiment.
Figure 7:
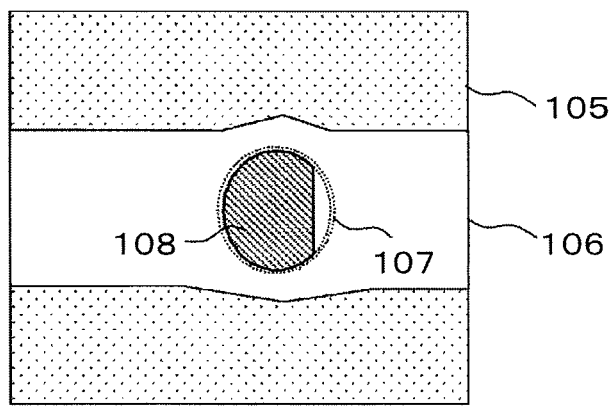
FIG. 7 is another example of the SEM image of the sample to be measured according to the first embodiment.

FIG. 6 shows a schematic SEM image of the same pattern as in FIG. 5 using the first imaging condition. The hole pattern 107 is emphasized, and the contour of the lower layer wiring 108 is weaker than the contour of the hole pattern 107. Under the second imaging condition, the incident energy of the electron beam is increased and the current is also increased. They are 1600 V and 16 pA, respectively. The scanning speed is decreased. Interlaced scanning is used as the scanning method. The interlaced scanning herein means a scanning method of repeating the scanning in the horizontal direction skipping every other row in the vertical direction in the imaging area, and then repeating the horizontal scanning of the skipped rows. As a result, the backscattered electron image is more emphasized in the second SEM image than in the first SEM image, in which SEM image the metal wiring can be easily measured. FIG. 7 shows a schematic SEM image of the same pattern in FIG. 5 acquired under the second imaging condition. Contrary to FIG. 6, the contour of the hole pattern 107 is weaker and the contour of the lower layer wiring 108 is emphasized. Both the first and second SEM images employ the imaging condition capable of imaging the trench pattern on the first layer of the sample. This is because the images will be used for detection of the imaging position shift amount between the first and second SEM images as will be described later in detail.

FIG. 7 is also an example of the shift of the imaging position, in which the position of the hole pattern 107 is shifted to the right compared with FIG. 6. It should be noted that the imaging condition can be set as desired depending on the material and the structure of the measuring object in this embodiment.

Next, detection of the imaging position shift amount at Step S6 is described. In this embodiment, the sample positioning is performed before the first and second SEM image acquisition, respectively. Therefore, the imaging position of the SEM image is shifted depending on the accuracy of the sample positioning. Furthermore, though different from this embodiment, even when the SEM image is continuously acquired using the first and second imaging conditions after the sample positioning, the sample may shift due to vibration or thermal vibration between the two imaging time points and the irradiation area of the electron beam may be changed due to the change of the charged state of the sample. Therefore, to obtain a single measurement value using both of the two different SEM images, the imaging position shift amount between the SEM images must be corrected.

In this embodiment, the trench pattern on the sample surface that is not to be measured is imaged on both the first SEM image and the second SEM image. The imaging position shift amount between the images is detected using the trench pattern on both images in common. First, the contour of the trench pattern is extracted from the first and second SEM images. Next, a correlation value between the images is obtained while shifting the mutual position of the extracted contours, and the position shift amount with the largest correlation value is assumed as the imaging position shift amount between the images. In a direction transverse to the trench, the shift can be distinctly detected because the contours of a plurality of trenches appear. Even in a direction parallel to the trench, the imaging position shift amount can be detected by pattern matching because the contour of the trench has a roughness. This method can reliably detect the position shift amount because the roughness in the contour always occurs due to the material and the manufacturing process of the trench.

As the method of detecting the position shift amount, an optimal method can be selected depending on the imaging state of the pattern. For example, a method using Fourier transform can be used against the brightness change, such as phase only correlation. Furthermore, not only the translational shift but also the rotational shift can be corrected. One method of detecting the rotational shift would be, for example, a method using rotation invariant phase only correlation. Moreover, it is also possible to detect the position shift amount after performing noise removal and/or contour emphasis/extraction on the image. It should be noted that the invention is not limited to the positioning method. In this embodiment, the imaging position shift amount is detected using a pattern different from the pattern to be measured. This is because detection of the imaging position shift amount using the pattern to be detected will lead to a larger error since visibility of the pattern to be measured may greatly vary between the first and second SEM images. However, if it is suitable for detection of the position shift amount, adjustment of the imaging position may be performed including the hole pattern and the lower layer wiring pattern to be measured.

Next, Step S7 of associating the first SEM image and the second SEM image with respect to each measuring location is described. At this step, data including data name, coordinate of measuring location, position shift amount, and the like of the two SEM images may be generated and stored in the data storage device 103. It is also possible to integrate the two images. Integration means combining two pieces of image data to form a single piece of image data. It is desirable at this time to be able to easily reproduce the two pieces of image data separately and that the imaging position shift has been corrected on the image. For example, they may be integrated in an image format corresponding to RGB colors. In general, the SEM image is generally a monochromatic image because it uses the brightness of the detected signal electron as brightness information. Therefore, up to three images can be stored by storing the brightness information of the SEM image into the three colors of RGB, respectively. Otherwise, the image may be integrated in a format compatible with a frame or multi-page format. For example, a plurality of images can be stored as frames in a movie format. In a case of a still image format, a multi-page TIFF or animation GIF format could store therein a plurality of images.

Figure 8:
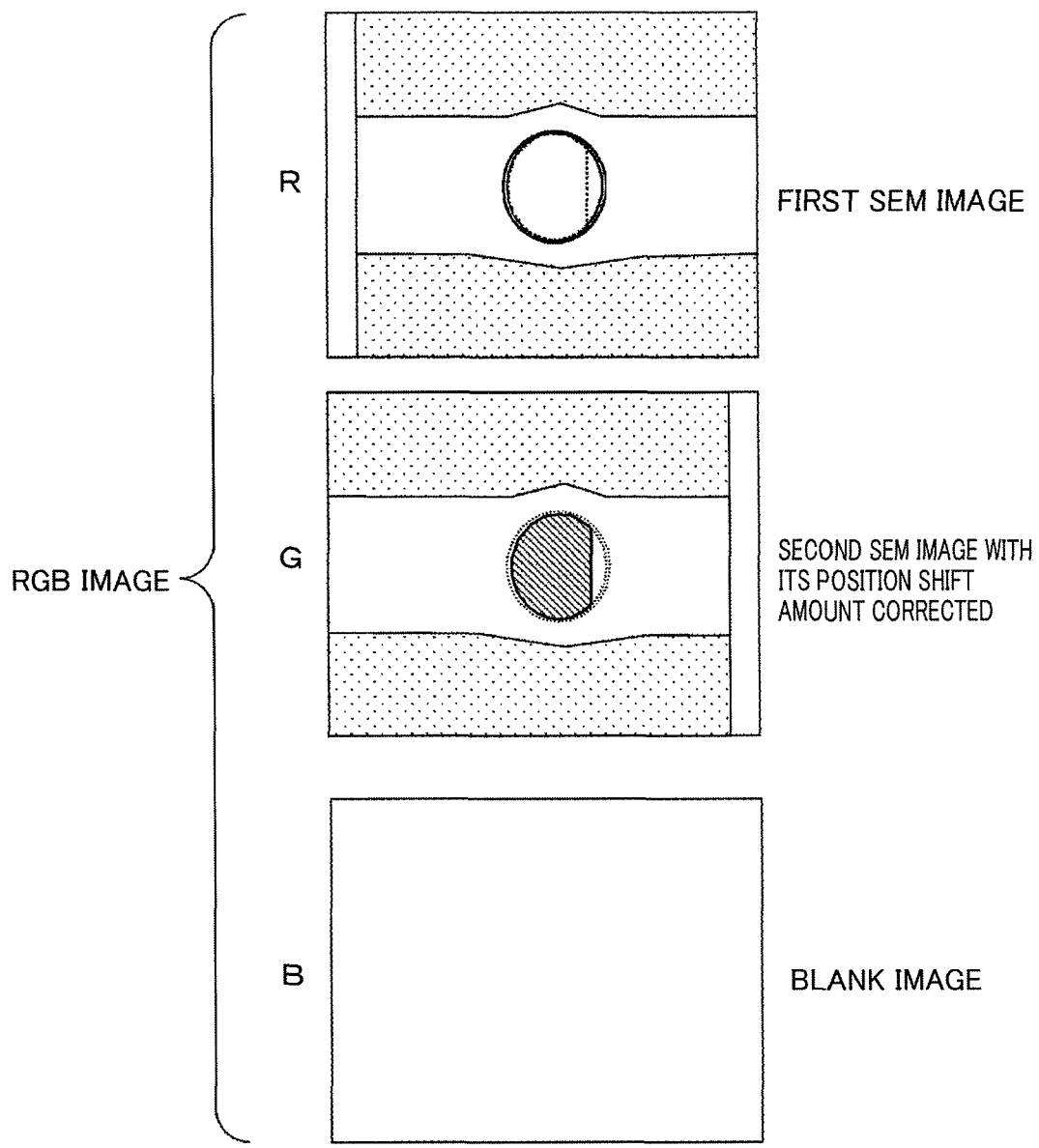
FIG. 8 is a schematic diagram illustrating an exemplary method of storing a plurality of SEM images as a single image according to the first embodiment.

In this embodiment, the images are integrated into an image corresponding to the RGB colors. As shown in FIG. 8, the brightness of the first SEM image is stored as the R brightness, and the brightness of the second SEM image is stored as the G brightness of the RGB. The B brightness is left blank. In the second SEM image stored as the G brightness, to eliminate the imaging position shift from the first SEM image, the pixel position is shifted based on the pattern imaging position shift amount with respect to the first measured image detected at Step S6. The image size is made larger than the taken image so as to compensate for the position shift amount. With the integrated image, the first SEM image can be displayed using the R brightness alone, and the second SEM image adjusted to the imaging position of the first SEM image can be displayed using the G brightness alone.

Next, the pattern shape measurement at Step S8 is described. A usual CD-SEM measurement generally detects the pattern contours of the measuring object and measures the distance between the contours. According to this embodiment, a plurality of SEM images taken under different imaging condition are acquired from one measuring location. This makes it possible to extract the contours of the pattern to be measured from each image and measure the contours, and to extract the contours from an image resulting from an operation among SEM images such as a differential image and a summed image to perform the measurement. The latter is suitable for the case in which the contour of the pattern to be measured can be made clear by performing the inter-image operation. However, the former is suitable for the case where the measurement accuracy is significant because the image operation may lead to an error. Thus, the optimal contour extracting method can be selected, including combination of a plurality of images, depending on the measuring object and quality of the SEM image. Furthermore, it is also possible to select a contour of the measuring object from among a plurality of contours extracted from a plurality of images. For example, it is possible to measure the position shift amount between the contour extracted from the first SEM image and the contour extracted from the second SEM image.

Next, the procedure of the pattern shape measurement at Step S8 is explained in detail with reference to FIG. 9. First, the contours are extracted from the first and second SEM images (Step S21, Step S22). To extract the contour of the pattern from the image, for example, a changing point, the maximum value, the minimum value, or an arbitrary position between the maximum and the minimum values of the brightness of the SEM image, the derivative of the brightness, or the second derivative of the brightness is detected as a contour point. The contour is formed by fitting a straight line, a curve, or a combination thereof with respect to a plurality of contour points. To facilitate the contour extraction, an image processing such as the noise removal or the contour emphasis may be performed on the SEM image in advance. Moreover, the optimal contour extracting method can be applied to each imaging condition. It should be noted that the invention is not limited to the method of extracting the contour from the SEM image.

Figure 10:
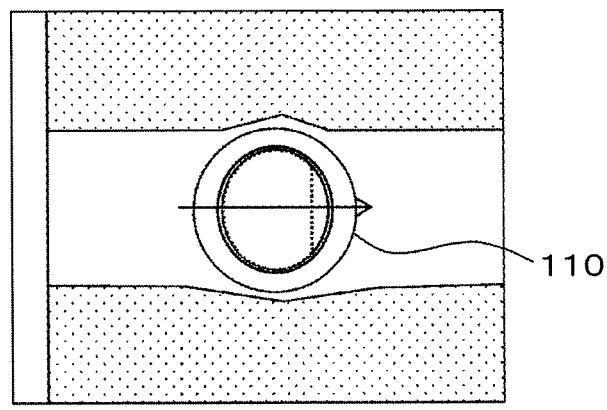
FIG. 10 is a schematic diagram illustrating a contour extraction of the pattern to be measured from the SEM image according to the first embodiment.
Figure 11:
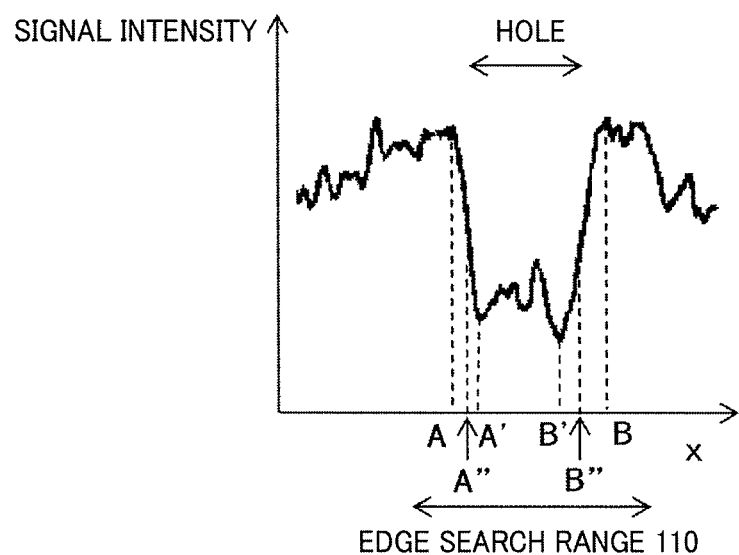
FIG. 11 shows a brightness profile of the SEM image for explaining the contour extraction shown in FIG. 10.

Next, the contour extraction as shown in FIGS. 10 and 11 is explained. In this embodiment, the contour of the hole pattern is extracted from the first SEM image. A contour extraction area 110 is provided first.

As shown in FIG. 10, the center of this area is set to coincide with the substantial center of the hole. The substantial center of the hole is obtained from pattern matching with the reference image registered to the recipe. The brightness change in the contour extraction area 110 is then focused on to form the contour.

FIG. 11 shows the brightness profile in a location indicated by an arrow in FIG. 10. In the first SEM image, the imaging condition is optimized to easily measure the hole shape, and the brightness drastically decreases inside the hole as shown in FIG. 11. Although there is a brightness change caused by the metal wiring in the hole, it is smaller than the brightness change at the hole contour. Therefore, the hole contour can be determined without an interference by the metal wiring. After smoothing the brightness profile in FIG. 11, the brightness in the contour extraction area 110 is explored from the substantial center of the hole toward the outside of the hole, thereby determining the maximum value and the minimum value. Exploring the brightness from the center toward the left in FIG. 11, a point A' having the minimum brightness and a point A having the maximum brightness are found. The brightness at the point A is assumed as 100%, the brightness at the point A' as 0%, and a point A" having the brightness equivalent to 40% as the contour point of the hole. Similarly, exploring the brightness from the center toward the right, a point B having the maximum brightness and a point B' having the minimum brightness are found and a 40% point B" is determined as the contour point of the hole. The similar processing is performed in a 180-degree rotating direction around the hole center to determine the contour points of the entire hole. Next, approximate straight lines and curves are obtained from the contour points to define the contour. An ellipse approximate to the group of the extracted contour points is defined as the contour extracted from the first SEM image.

Next, the contour extraction from the second SEM image is described. The contour of the lower layer metal wiring is extracted from the second SEM image.

First, as shown in FIG. 11, the contour extraction area 110 is provided near the hole. The position of the contour extraction area 110 is determined by the pattern matching with the reference image, as with the first SEM image. Since the second SEM image has the brightness of the hole contour, the lower layer wiring, and the like different from those of the first SEM image, the reference image for determining the substantial center of the hole is preferably different from the reference image used for the first SEM image.

Figure 12:
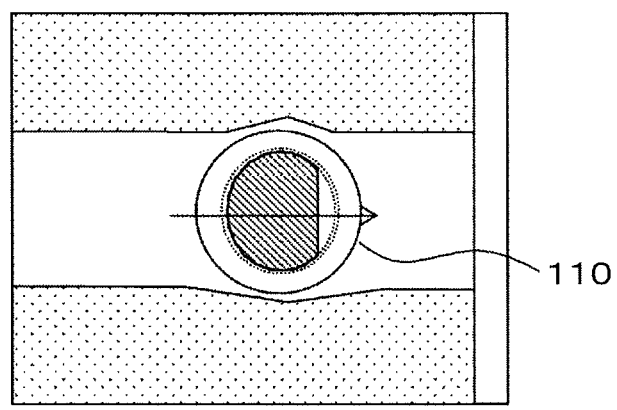
FIG. 12 is a schematic diagram illustrating the contour extraction of the pattern to be measured from the SEM image according to the first embodiment.
Figure 13:
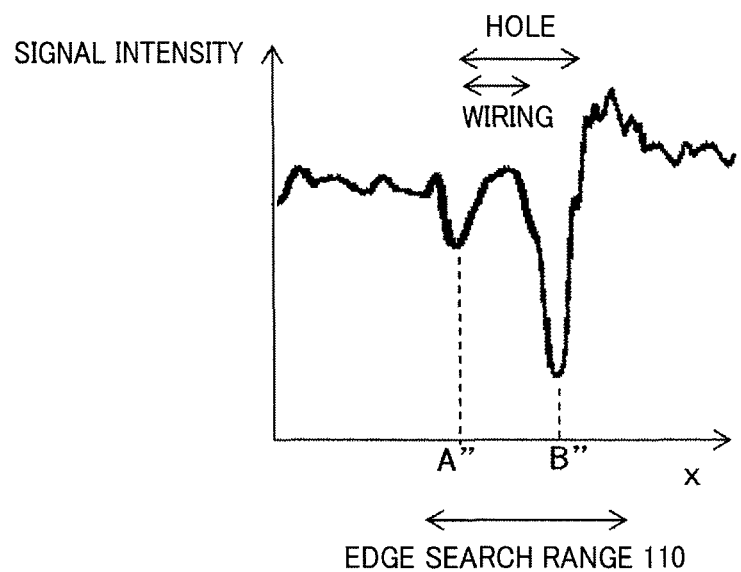
FIG. 13 shows a brightness profile of the SEM image for explaining the contour extraction shown in FIG. 12.

FIG. 13 shows the brightness profile in a location indicated by an arrow in FIG. 12. In the second SEM image, the imaging condition is optimized to easily measure the metal wiring on the lower layer. FIG. 13 shows higher brightness of the metal wiring compared with FIG. 11. To define the contour of the metal wiring, the brightness in the contour extraction area 110 is explored from the substantial center of the hole toward the outside of the hole, and the point having the minimum brightness is determined to be the contour point. In FIG. 13, a point A" having the minimum brightness when exploring the brightness from the center toward the left and a point B" having the minimum brightness when exploring the brightness from the center toward the right are determined to be the contour points of the metal wiring. The similar processing is performed in a 180-degree rotating direction around the hole center to determine the contour points of the entire metal wiring. Next, straight lines and curves approximate to the group of the extracted contour points are obtained, and the contour including an ellipse and a straight line is defined as indicated by the contour of the shadowed area in FIG. 12.

Figure 9:
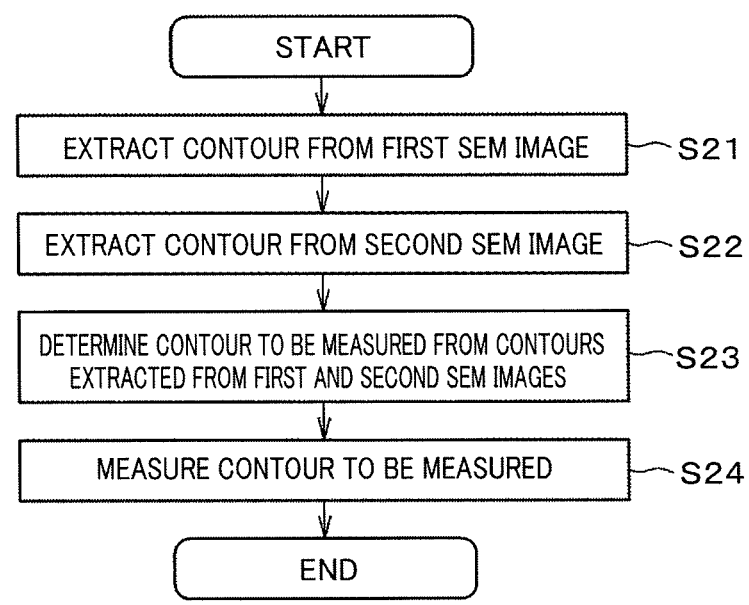
FIG. 9 is a flowchart illustrating the pattern measurement (S8) shown in FIG. 3 in detail.
Figure 14:
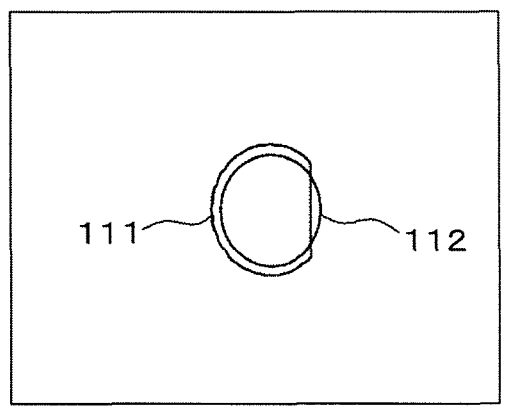
FIG. 14 shows two different pattern contours extracted from two different SEM images according to the first embodiment.

Next, the procedure of determining the contour to be measured based on the contours extracted from the first and second SEM images shown in FIG. 9 (Step S23) is described. At this step, a contour combining the pattern contours extracted from a plurality of images can be reconstructed as the measuring object. FIG. 14 shows the contours extracted according to the embodiment. In FIG. 14, a contour 112 extracted from the first SEM image and a contour 111 extracted from the second SEM image are superposed. In this embodiment, the diameter of the hole pattern 107 and the area of the lower layer wiring pattern 108 are to be measured. For the former, the contour 112 extracted from the first SEM image is assumed as the measuring object. For the latter, an area surrounded by both the contour 112 extracted from the first SEM image and the contour 111 extracted from the second SEM image as indicated by the shadowed area in FIG. 15 is assumed as the pattern to be measured, and its contour is assumed as the contour to be measured.

The reason why the contours extracted from the first and second SEM images are used to measure the lower layer wiring pattern 108 is now described. The second SEM image is taken under the imaging condition optimized to capture the contour of the metal wiring pattern exposed through the hole. However, if the contour of the metal wiring is not exposed but hidden, the contour would be relatively obscure.

This can be seen from the fact that the brightness change on the border A" between the metal wiring and the hole is smaller than that on the contour B" of the metal wiring exposed in the hole in FIG. 13. Furthermore, the imaging condition of the second SEM image employs relatively high incident energy of the electron beam into the sample. Thus, when an insulating film is thinner near the hole border, the electron beam is transmitted and the signal electron caused by an unexposed metal wiring may possibly be captured. As a result, the border between the metal wiring and the hole in the second SEM image may appear outer than the actual position.

Figure 15:
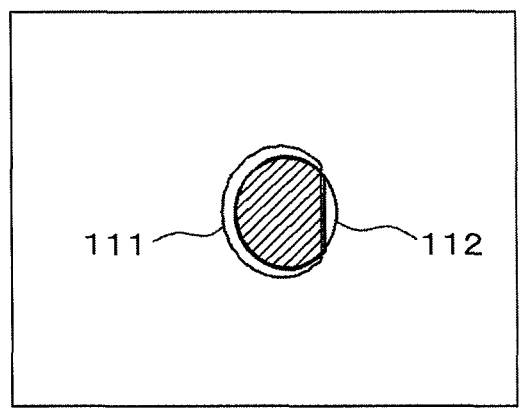
FIG. 15 shows a pattern to be measured reconstructed from the two different pattern contours extracted from the two different SEM images according to the first embodiment.

Also in some points in FIGS. 14 and 15, the contour of the wiring pattern 108 extracted from the second SEM image does not coincide with the contour 112 extracted from the first SEM image but is located outside thereof. In this view, it can be conceived that the contour between the hole and the metal wiring can be extracted more exactly from the first SEM image. Therefore, the area surrounded by the contour 112 extracted from the first SEM image and also surrounded by the contour 111 extracted from the second SEM image is determined to be the pattern to be measured. The contour of the pattern to be measured is reconstructed as the contour of the measuring object.

Figure 16:
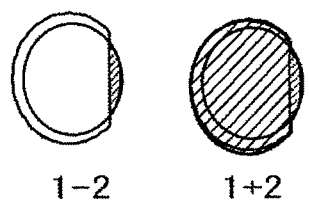
FIG. 16 is a schematic diagram illustrating a method of determining the contour of the measuring object performed at Step S23 in FIG. 9.

It should be noted that the invention is not limited to the method of reconstructing the contour. The reconstructing method can be selected depending on the measuring object and the image to be taken. Other method would reconstruct, as shown in FIG. 16, a contour of an area included in the first SEM image but not included in the second SEM image (1−2), a contour of an area included in the first SEM image and an area included in the second SEM image (1+2), or the like.

At Step S23, when a plurality of contours are extracted from the SEM image, the contour to be reflected upon the contour to be measured can be selected. For example, an explanation is given with a case of detecting both the contour of the hole pattern 107 and the contour of the lower layer wiring 108 in the second SEM image shown in FIG. 7 using a contour extracting method different from this embodiment. At Step S23, the condition is determined in advance to select the contour including a straight line with priority from the second SEM image. Thus, the contour of the shadowed area including more straight portions can be selected from among the contours detected from FIG. 7. After this, as described above, the contour of the pattern to be measured is reconstructed.

It is also possible to select the contour to be reflected upon the contour to be measured by comparing with contours extracted from another SEM image if a plurality of contours are extracted from the SEM image.

For example, an explanation is given with a case of detecting both the contour of the hole pattern 107 and the contour of the lower layer wiring 108 using a contour extracting method different from this embodiment. At Step S23, the condition is determined in advance to select the contour more different from the contour extracted from the first SEM image with priority. Compared with the contour of the hole pattern 107 obtained from the first SEM image in FIG. 6, the more different contour of the lower layer wiring 108 is selected. One method of selecting more different contour would be, for example, a method of selecting a contour with larger position shift amount of the center of gravity of the contour.

Figure 21:
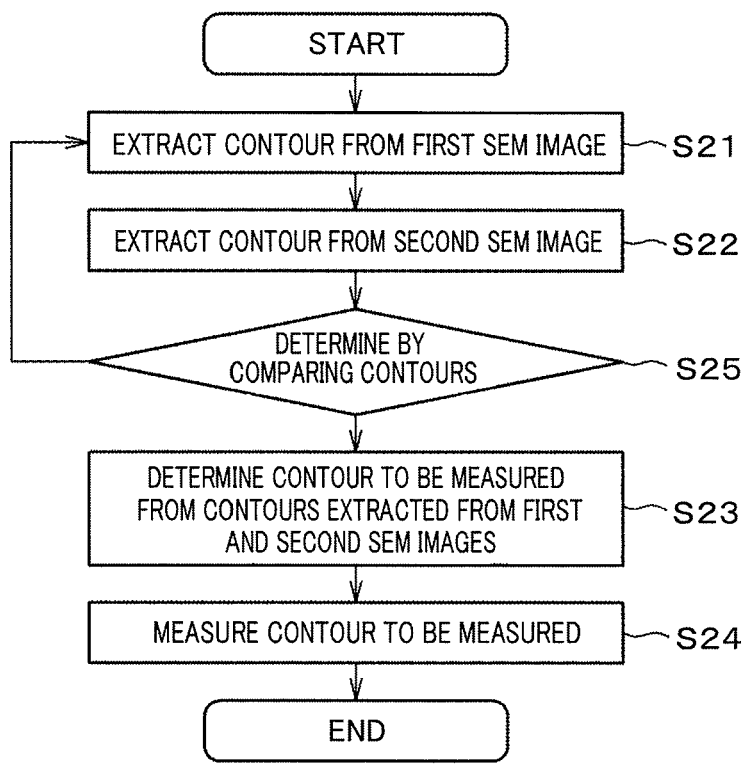
FIG. 21 is a flowchart according to the first embodiment with a part of the pattern measurement modified.

Moreover, FIG. 21 shows a procedure of redoing the contour extraction using another contour extracting method based on the result of comparing the contour extracted from the first SEM image and the contour extracted from the second SEM image. FIG. 21 includes Step S25 of making a determination by comparing the contour extracted from the first SEM image and the contour extracted from the second SEM image. As a result of the comparison between the contours, for example, if it is determined that the contours are different from each other, the process proceeds to Step S23. On the contrary, if it is determined that the same contours are selected, the process returns to Step S21 to perform the contour extraction again.

The method of matching the information of the contours extracted from the first SEM image and the second SEM image and then reflecting the result to the contour in each image as described above is useful when it is difficult to clearly identify the contours only by taking a plurality of SEM images under different imaging conditions and using the contour extracting method suitable for each image.

As described with reference to FIG. 8, according to this embodiment, the imaging position shift amount from the first SEM image is corrected in the second SEM image. When the correction of the imaging position shift amount is not reflected to the image but only the data of the imaging position shift amount is left, the imaging position shift amount in the image detected at Step S8 is reflected to the contour position at this step.

As described above, the contour to be measured can be correctly selected without confusing adjacent contours by taking the steps of taking a plurality of images under different imaging conditions, extracting contours using an extracting method suitable for each image, adjusting the imaging positions of the images, and determining the contour to be measured from among a plurality of contours.

Next, a measurement of the contour to be measured (Step S24) is performed. At this step, the feature amount of the pattern shape such as the length of the contour, distance between contours, inclination, angle, area, and the like is quantified from the contour to be measured. In this embodiment, the diameter of the hole pattern 107 and the area of the lower layer wiring pattern 108 are to be measured. For the diameter of the hole pattern 107, an ellipse approximate to the contour 112 extracted from the first SEM image, and its average diameter may be used as measurement values. For the area of the lower layer wiring pattern 108, the area surrounded by the contour of the shadowed area shown in FIG. 15 reconstructed at Step S23 is used as the measurement value. It should be noted that the invention is not limited to the method of quantifying the objective contour.

Next, the GUI required for performing the procedure described with reference to FIG. 9 is described. To perform the procedure described with reference to FIG. 9, the GUI for setting conditions for the method of extracting the contour from each of the plurality of SEM images, the method of determining the contour to be measured from among a plurality of contours, and the method of measuring the contour to be measured are required.

Figure 17:
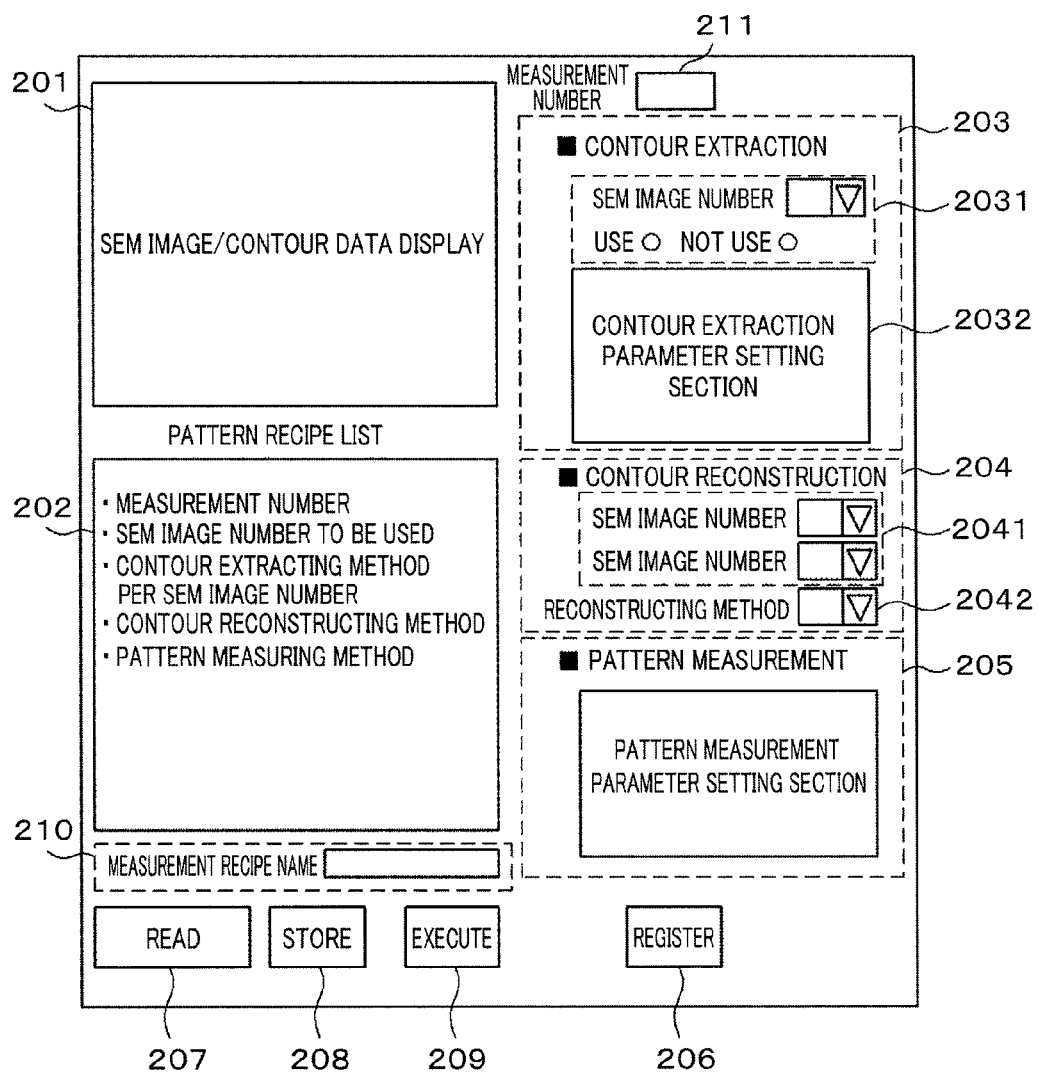
FIG. 17 shows an example of a GUI screen used for the pattern measurement according to the first embodiment.

FIG. 17 shows an example of the GUI for generating a measurement recipe required for performing the procedure in FIG. 9. The measurement recipe herein refers to a parameter set required for performing the procedure in FIG. 9. The GUI includes a data display section 201, a pattern recipe list display section 202, a contour extracting method setting section 203, a contour reconstructing method setting section 204, and a pattern measuring method setting section 205. The relation between each setting section and each step in FIG. 9 is as follows: the contour extracting method setting section 203 sets parameters required for Steps S21 and S22 in FIG. 9, the contour reconstructing method setting section 204 for Step S23 in FIG. 9, and the pattern measuring method setting section 205 for Step S24 in FIG. 9.

Next, an outline of the procedure of generating the measurement recipe is described. According to the embodiment, a plurality of measurements can be registered for a single measuring location. A measurement number is assigned to each measurement and displayed on a measurement number display section 211. Next, for each measurement, required parameters are set to the contour extracting method setting section 203, the contour reconstructing method setting section 204, and the pattern measuring method setting section 205, and then a register button 206 is pressed. When the register button 206 is pressed, the above parameters for each measurement are collectively stored as a pattern recipe. At this time the pattern recipe is temporarily stored in the computing section. The stored pattern recipe is displayed on the pattern recipe list display section 202. The information of the pattern recipe displayed on the pattern recipe list display section 202 may include, for example, the measurement number, the SEM image number used, the contour extracting method, the contour reconstructing method, and the pattern measuring method. After registering all the measurements required, a store button 208 is pressed. The store button 208 is used to collectively store one or more pattern recipes displayed on the pattern recipe list display section 202 as a measurement recipe. At this time, the measurement recipe is named and stored in the data storage device 103. The name of the measurement recipe is also displayed on a measurement recipe display section 210. Furthermore, by pressing a read button 207, the measurement recipe stored in the data storage device 103 can be fetched to the computing section 102. Moreover, when an execute button 209 is pressed, a window for selecting the image to be measured appears. By selecting the image to be measured, the measurement recipe fetched to the operating section 102 can be executed on the image. It should be noted that the same measurement is performed on all the measuring locations on the sample according to the procedure shown in FIG. 3 by including the measurement recipe in the wafer measurement recipe.

Details of the GUI in FIG. 17 will be described below according to the procedure shown in FIG. 9. According to the embodiment, two types of measurements including the diameter of the hole pattern 107 and the area of the lower layer wiring pattern 108 are performed. An explanation is given first taking the latter case in which the lower layer wiring pattern 108 is measured. First, one example of the SEM image to be measured or design data is read as the reference image. The recipe is generated while actually processing the reference image.

In the contour extracting method setting section 203, it is selected whether a plurality of SEM images taken at the same measuring location are used for the contour extraction, and if they are used, the contour extracting condition is set. In this embodiment the contour of the lower layer wiring pattern 108 is extracted from two of the first SEM image and the second SEM image. As shown in FIG. 15, both the contour 112 extracted from the first SEM image and the contour 111 extracted from the second SEM image are used. Now, respective contour extraction methods are set in the contour extracting method setting section 203. First, in the contour extracting method setting section 203, the first SEM image (SEM image number 1) is selected and set to use it. At this time, the first SEM image of the reference image is displayed on the data display section 201. Furthermore, the contour extracting method is set in a contour extraction parameter setting section 2032. The contour extracting method set here is the method explained using FIG. 11. Upon setting, the contour extracted from the first SEM image of the reference image according to the set extracting method is displayed on the data display section 201 as superposed on the first SEM image of the reference image. An explanation of the contour extraction parameter setting section 2032 is omitted here because the embodiment does not depend on the details of the contour extraction parameter setting section 2032. Next, in a contour extraction SEM image selecting section 2031, the second SEM image (SEM image number 2) is selected and set to use it. At this time the second SEM image of the reference image is displayed on the data display section 201. Furthermore, the contour extracting method is set in the contour extraction parameter setting section 2032. The contour extracting method set here is the method explained using FIG. 13. Upon setting the contour extracting method, the contour extracted from the second SEM image of the reference image according to the set extracting method is displayed on the data display section 201 as superposed on the second SEM image of the reference image. Although the contour extracting method setting section 203 includes only one contour extraction parameter setting section 2032, it is possible to set different parameters with respect to each image.

Next, the contour reconstructing method setting section 204 is described. This is used to set parameters required for the process at Step S23 in FIG. 9. For the measurement of the lower layer wiring pattern 108, as described above, the area surrounded by both the contour 112 extracted from the first SEM image and the contour 111 extracted from the second SEM image is assumed as the pattern to be measured. In the contour reconstructing method setting section 204, the first SEM image (SEM image number 1) and the second SEM image (SEM image number 2) are selected in a SEM image-to-be-reconstructed selecting section 2041. Moreover, "AND" is selected in a reconstructing method selecting section 2042. "AND" has been registered as a method of acquiring an area commonly surrounded by the contours extracted from the images selected in the SEM image-to-be-reconstructed selecting section 2041, and reconstructing the contour. The invention is not limited to the contour reconstructing method. A required contour reconstructing method can be generated and selected from the selecting section 2042. Upon setting the above setting item, the reconstructed contour is displayed on the data display section 201.

Next, in the pattern measuring method setting section 205, the measuring method explained with reference to Step S24 is set. The area surrounded by the contour of the shadowed area in FIG. 15 reconstructed at Step S23 is set to be the measurement value. An explanation of the pattern measuring method setting section 205 is omitted here because the embodiment does not depend on the details of the pattern measuring method setting section 205. After this setting, a measured value is displayed on the data display section 201.

Next, a method of setting conditions for the measurement of the diameter of the hole pattern 107 in GUI shown in FIG. 17, which is the other measurement according to the embodiment, is described. Here, only the difference from the measurement of the area of the lower layer wiring pattern 108 described above is described briefly. With the diameter of the hole pattern 107, the contour is extracted only from the first SEM image and the reconstruction is not performed. Therefore, the first SEM image (SEM image number 1) is selected and set to use it in the contour extraction SEM image selecting section 2031, and the contour extraction method described with reference to FIG. 11 is set in the contour extraction parameter setting section 2032. Subsequently, the second SEM image (SEM image number 2) is selected and set not to use it in the contour extraction SEM image selecting section 2031. In the contour reconstructing method setting section 204, the first SEM image (SEM image number 1) is selected in the SEM image-to-be-reconstructed selecting section 2041 and "NO RECONSTRUCTION" is selected in the reconstructing method selecting section 2042. "NO RECONSTRUCTION" has been registered as a method of using the contour extracted from the SEM image as it is as the contour to be measured. In the pattern measuring method setting section 205, the ellipse approximate to the contour is obtained and its average diameter is set to be the measurement value.

The present invention does not depend on the structure of the sample to be measured. This embodiment uses the sample on which the trench pattern 106, the hole pattern 107, and the lower layer wiring pattern 108 can be observed, as illustrated in FIG. 5. The embodiment is also valid for a sample with different structure.

Figure 20:
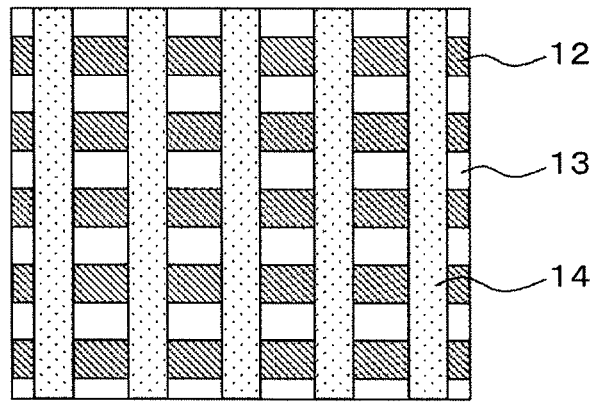
FIG. 20 shows an example of the SEM image of the sample including line patterns on the upper layer and the lower layer.

FIG. 20 shows an example including line patterns on both the upper layer and the lower layer. For example, in a case of a sample on which the transistor gate electron has been processed, the image in FIG. 20 is obtained showing the gate electron of the transistor as an upper layer line pattern 14, an element isolation region of the transistor as a lower layer line pattern 12, and an active region constituting a channel of the transistor as a lower layer inter-line pattern space 13. In the image shown in FIG. 20, if the lower layer line pattern 12 is clearly visible, it interferes with the measurement of the upper layer line pattern 14. This is because the contour of the line pattern 14 and the contour of the lower layer line pattern 12 are confused at an intersection of an edge of the line pattern 12 and an edge of the line pattern 14. Therefore, it is possible to make a measurement without confusion between the contour of the line pattern 14 and the contour of the lower layer line pattern 12 by using the imaging condition emphasizing each of the upper layer line pattern 14 and the lower layer line pattern 12, alignment of these images, and a contour extraction method and a measuring method optimized for each image, as in the embodiment.

According to the embodiment, it is possible to acquire an SEM image with the imaging conditions optimized to easily extract the pattern contour with respect to each group of close patterns. It is also possible to employ the optimal contour extracting method with respect to each group of close patterns. Thus, the pattern to be measured can be extracted without being interfered with by other close patterns. Furthermore, the pattern to which the contour belongs can be identified by following the original SEM image. Moreover, by adjusting the imaging position of the SEM image, a measurement error caused by the imaging position shift can be eliminated.

Thus, confusion between the contour of the pattern to be measured and the contour of another pattern can be avoided in the step of selecting the contour to be measured. In addition, because the step of extracting the contour from the SEM image can be independent from the step of selecting the contour to be measured, the contour extracting method suitable for each pattern can be employed even when the measurement is performed using the contour belonging to a plurality of patterns. Therefore, a correct measurement can be performed even upon a plurality of patterns greatly varying in visibility in the SEM image.

Second Embodiment

The second embodiment shows an example of achieving the invention by acquiring the SEM image using the conventional SEM and using a novel pattern measuring program. The pattern measuring program according to this embodiment is incorporated in a computer and operates the computer as the pattern measuring apparatus. By incorporating the pattern measuring program in the computer, for example, the computing section shown in FIG. 4 can be constituted. It should be noted that the sample to be measured is same as that in the first embodiment. An explanation overlapping that of the first embodiment is omitted herein.

First, a plurality of SEM images of the same imaging location are acquired using the conventional SEM. In this embodiment, two of the first SEM image and the second SEM image are acquired. The imaging conditions thereof are same as those for the first SEM image and the second SEM image in the first embodiment.

Figure 18:
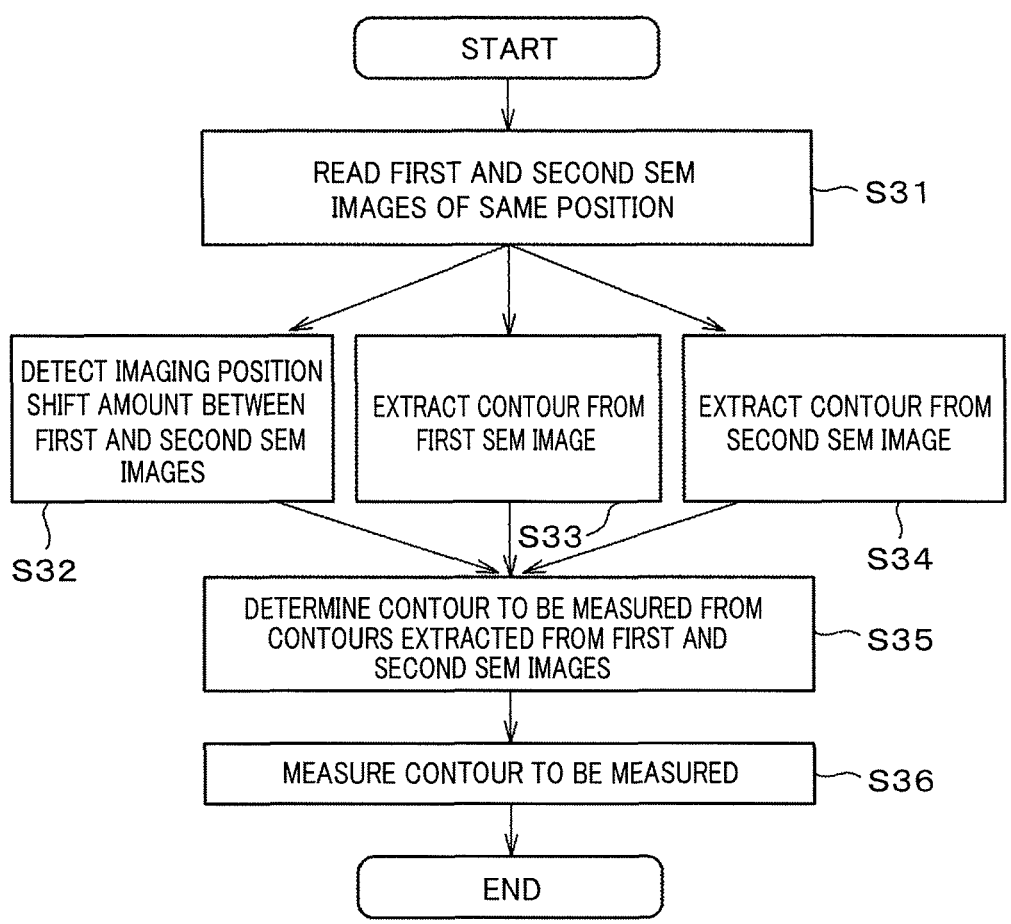
FIG. 18 is a flowchart illustrating contents of the pattern measurement according to a second embodiment.

Next, a procedure of a process performed by the pattern measuring program is explained with reference to FIG. 18. FIG. 18 outlines the procedure of the process performed by the pattern measuring program used in this embodiment. First, the first and second SEM images are fetched (Step S31). Then the detection of the imaging position shift between the first and second SEM images (Step S32), the pattern contour extraction from the first SEM image (Step S33), and the pattern contour extraction from the second SEM image (Step S34) are performed. Subsequently, the contour to be measured is determined from among the contours acquired at Steps S33 and S34 (Step S35). At Step S35, the contour to be measured is constituted from the contour with its imaging position shift corrected. Next, the measurement is performed using the contour to be measured (Step S36).

Details of each step are same as what was described in the first embodiment of the invention. Step S32 corresponds to Step S6 in FIG. 3, Step S33 to Step S21 in FIG. 9, Step S34 to Step S22 in FIG. 9, Step S35 to Step S23 in FIG. 9, and Step S36 to Step S24 in FIG. 9.

The invention is not limited to the order of the steps shown in FIG. 18. Although Step S32, Step S33, and Step S34 are performed in parallel in FIG. 18, they may be performed sequentially.

Figure 19:
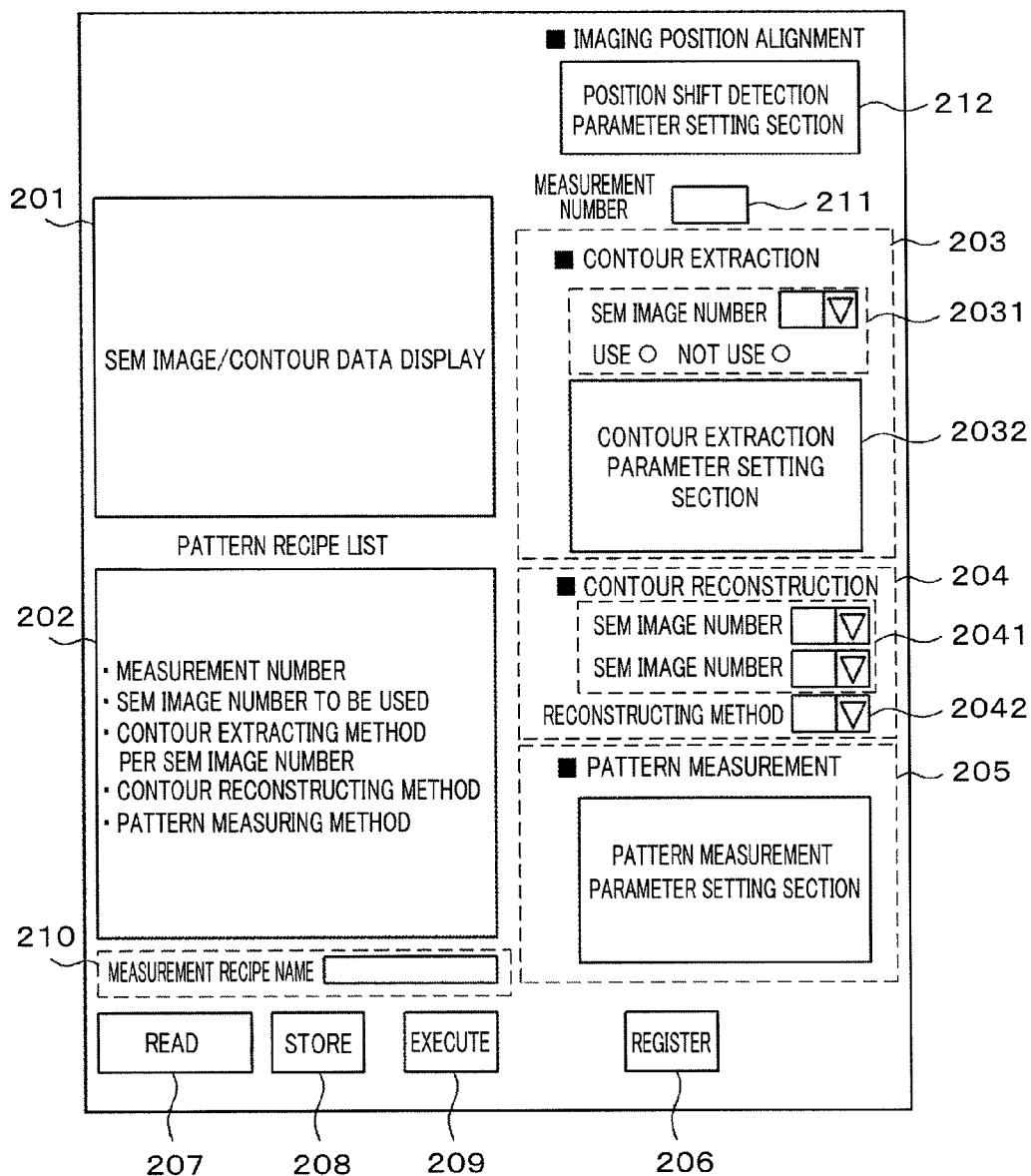
FIG. 19 shows an example of a GUI screen used for the pattern measurement according to the second embodiment.

Next, the GUI required for the pattern measuring program used in this embodiment is described. This program requires GUI enabling a condition setting for each of the imaging position shift detecting method in a plurality of SEM images taken at the same measuring location, the contour extracting method in each of the plurality of SEM images, the method of determining the contour to be measured from among a plurality of contours, and a method of measuring the contour to be measured. FIG. 19 shows an example of the GUI. This example has an imaging position shift detection method setting section 212 added to the example of the GUI shown in FIG. 17.

Third Embodiment

A third embodiment is characterized by determining the measurement result and redoing the adjustment of the imaging position of the plurality of SEM images if the result is determined to be abnormal, in addition to the procedure explained in the first embodiment. This is effective when the imaging states of the pattern commonly imaged greatly vary through the SEM images taken under different imaging conditions, making it difficult to adjust the imaging positions. The case in which it is difficult to adjust the imaging positions herein means, for example, a case in which a plurality of position shift amounts are detected based on similar criteria for determination.

Figure 22:
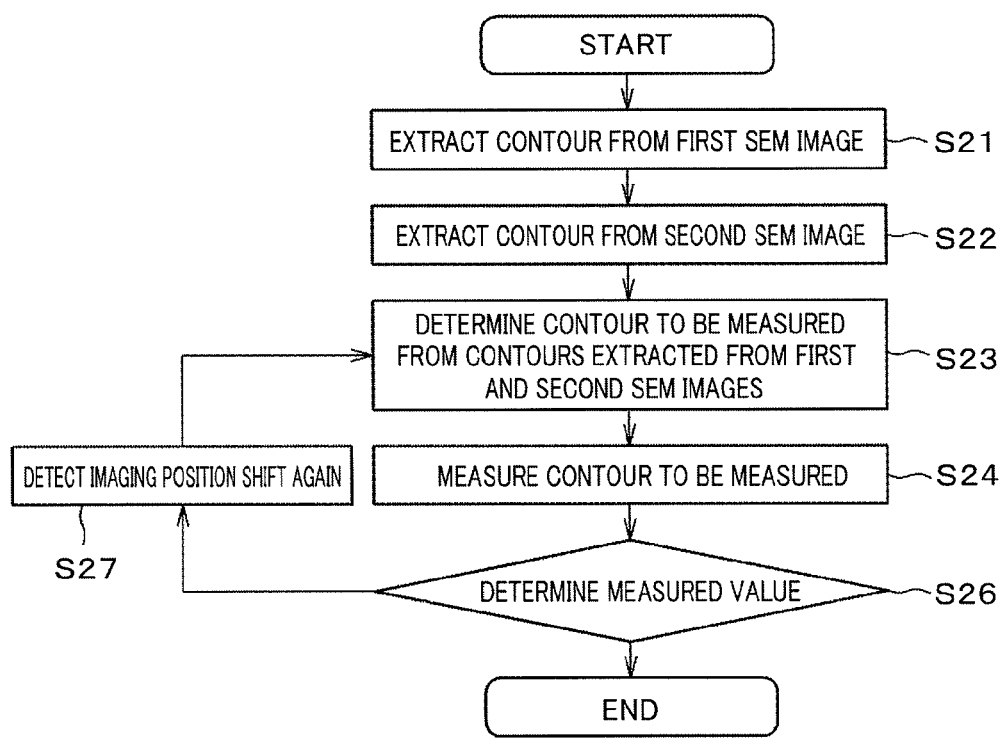
FIG. 22 is a flowchart illustrating contents of the pattern measurement according to a third embodiment.

FIG. 22 shows a flowchart illustrating the feature of this embodiment. The procedure shown in FIG. 9 is altered from the first embodiment. Step S26 of determining the measurement value obtained at Step S24 is provided to determine whether the measurement value is normal or abnormal. If it is determined to be normal, the flow is terminated at this point. If it is determined to be abnormal, the process proceeds to Step S27 for redoing the detection of the imaging position shift amount, and then returns to Step S23. At Step S23, the imaging position shift amount detected anew at Step S27 is reflected to the position of the contour extracted from the SEM image. Furthermore, using these contours, the contour to be measured is determined anew. At Step S24, the measurement is performed using the newly determined contour to be measured. Next, the measurement value is determined at Step S26. At this time, when the measurement value obtained by redoing the imaging position shift detection is same as the initial measurement value, or when the number of times having redone the imaging position shift detection reaches the predetermined upper limit, the process is terminated with the measurement value being abnormal. The abnormality is determined when, for example, the measurement value exceeds a predetermined upper or lower limit, when a difference from an average of values at other measuring locations exceeds the predetermined upper or lower limit in a case where the same measurement is performed at different measuring locations, and when a difference from an average of past measurement values measured using the sample with the same shape and the same recipe exceeds the predetermined upper or lower limit. According to this embodiment, not only the detection of the imaging position shift but also the determination of the contour to be measured at Step S26 can be repeated from the determination of the measurement value.

Moreover, using the flow shown in FIG. 22, for example, it is possible to automatically repeat changes of the imaging position detecting method and the contour to be measured determination method so that the measurement value comes in a desired variation. This technique can omit time and labor of conditioning the optimal imaging position detecting method and contour to be measured determination method in advance, and enables automatic conditioning using the variation of the measurement values as an index.

Fourth Embodiment

This embodiment is different from the first to third embodiments in the method of acquiring a plurality of detected images at the substantially same location on the sample under mutually different imaging conditions. In this embodiment, the plurality of detected images are acquired by detecting secondary charged particles or backscattered charged particles under mutually different detecting conditions, the particles being obtained by irradiating the sample with an electron beam.

This method also enables acquisition of a plurality of detected images with only one irradiation of the sample with the electron beam by using a plurality of detectors that detect the secondary charged particles or the backscattered charged particles. Thus, compared with the first to third embodiments emitting the electron beam more than once, the observation time can be reduced. Differences of this embodiment from the first embodiment will be described below. The measuring object is the sample shown in FIG. 5, like the first embodiment.

Figure 23:
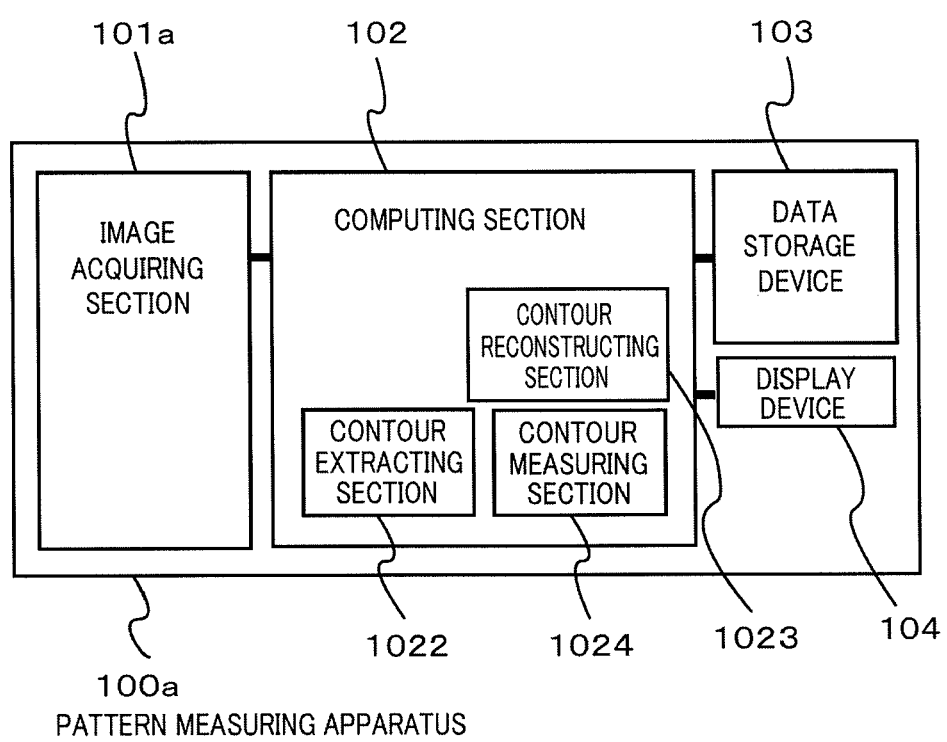
FIG. 23 is a block diagram of the pattern measuring apparatus according to a fourth embodiment.
Figure 24:
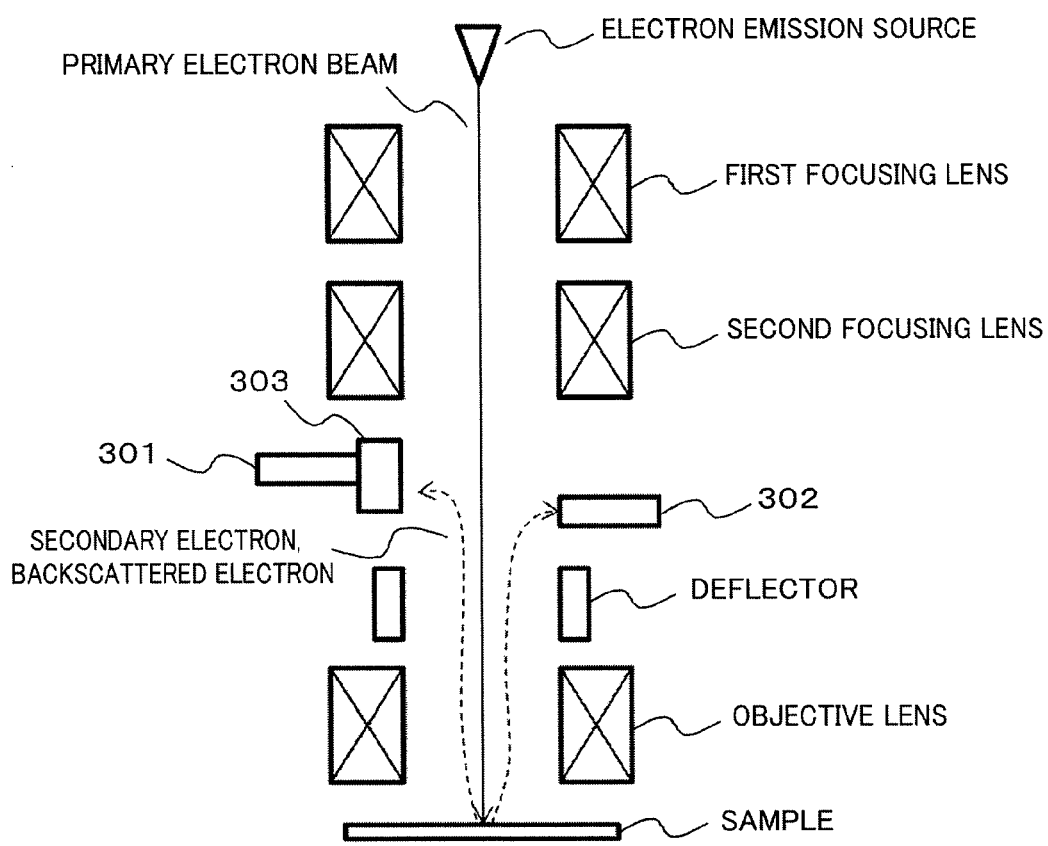
FIG. 24 is a configuration diagram of an SEM device used for an image acquiring section according to the fourth embodiment.

FIG. 23 shows a configuration of a pattern measuring apparatus used in this embodiment. Compared with the apparatus configuration of the first embodiment shown in FIG. 4, the position shift detecting section 1021 is removed, and an image acquiring section 101a constituted by an SEM device including a first detector 301 and a second detector 302 detecting the secondary charged particles and the backscattered charged particles, as shown in FIG. 24, is used as the image acquiring section. When acquiring a plurality of detected images by irradiating the sample with the electron beam only one time, the position of the measuring object usually does not shift in each detected image. Thus, the position shift detecting section 1021 is not necessarily required and therefore the position shift detecting section 1021 can be omitted.

The first detector 301 of the SEM device shown in FIG. 24 as used in the image acquiring section 101a is provided with an energy filter 303 capable of discriminating whether to or not to detect the secondary charged particles or the backscattered charged particles depending on their energy. The energy filter is a high pass filter which, for example, does not detect the secondary charged particles having relatively low energy but detects the backscattered electron having relatively high energy.

In this embodiment, the energy filter is optimized to acquire an image with emphasis on the lower layer wiring pattern 108 in FIG. 5 made of metal that easily captures the backscattered charged particles. Specifically, it is optimized to detect only the secondary charged particles or the backscattered charged particles having energy higher than the lowest energy of the secondary charged particles detected by the second detector 302 by 100 V or more. Under this condition, the detected image similar to that in FIG. 7 with emphasis on the lower layer wiring 108 can be acquired.

The second detector 302 is configured not to include the energy filter and thus to detect all of the secondary charged particles and the backscattered charged particles reached. In general, there are more secondary charged particles than the backscattered charged particles, and the secondary charged particles can produce an image with emphasis on the shape of the sample. With the second detector 302, a detected image similar to that in FIG. 6 is acquired from which the hole shape can be easily measured. The two different detected images can be acquired simultaneously by irradiating the sample with the electron with 800 V acceleration voltage and 8 pA beam current.

Although the secondary charged particles or the backscattered charged particles having different levels of energy are detected using the two different detectors in this embodiment, it is not limited to use the energy level. It may also be configured to detect the secondary charged particles or the backscattered charged particles having different angles of orientation or elevation.

Figure 25:
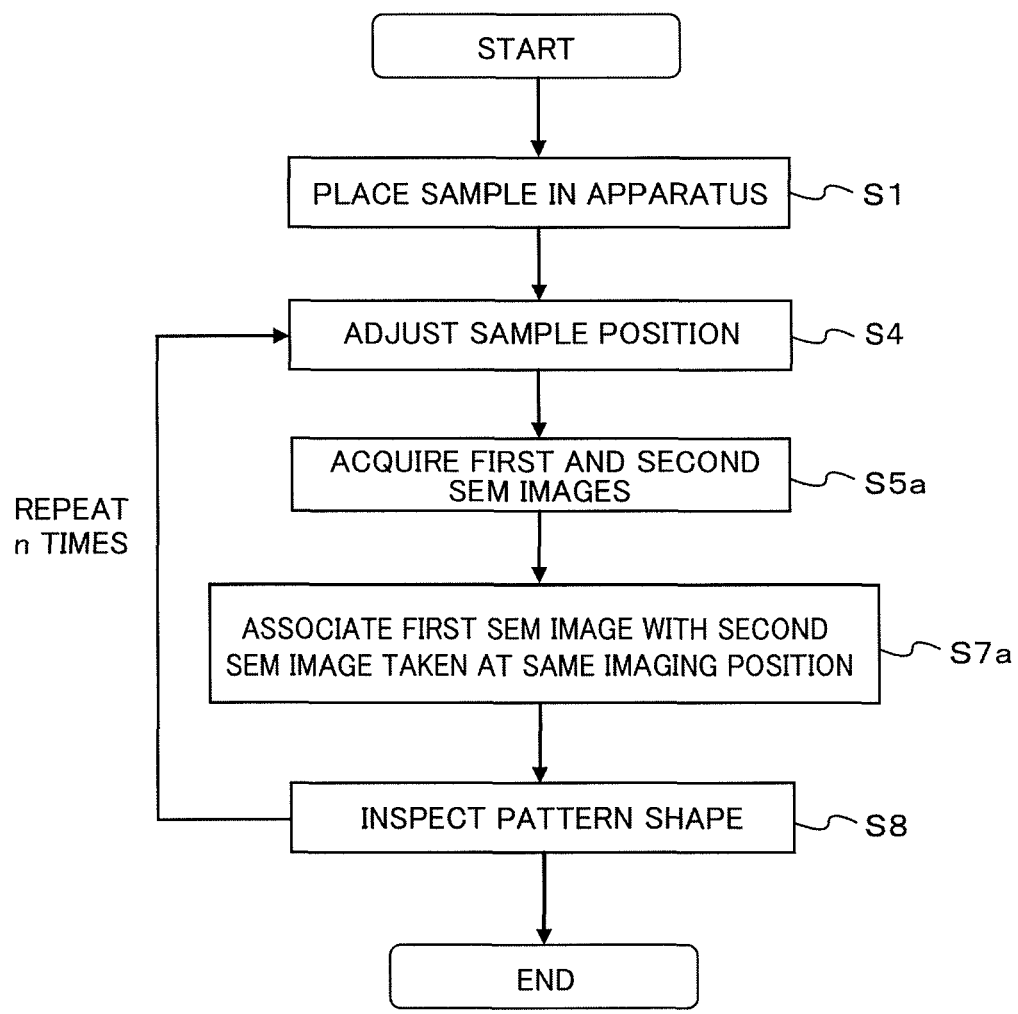
FIG. 25 is a flowchart illustrating contents of the pattern measurement according to the fourth embodiment.

FIG. 25 shows a pattern measuring procedure according to this embodiment. The difference from the measuring procedure according to the first embodiment shown in FIG. 3 is described with reference to FIG. 25. In this embodiment, n measuring locations on the sample are irradiated with the electron beam only one time each. Thus, the sample positioning that was performed two times at Steps S2 and S3 in FIG. 3 can be performed only once at Step S3, and the image acquisition that was performed two times at Steps S4 and S5 can be performed only once at Step S5a.

At Step S5a, the first SEM image available from the first detector 301 and the second SEM image available from the second detector 302 are acquired simultaneously. The detection of the position shift amount that was performed at Step S6 in FIG. 3 is not required anymore because the position shift does not occur between the first SEM image and the second SEM image.

At Step S7a of associating the first SEM image and the second SEM image, the first SEM image and the second SEM image are stored in a single piece of data in the multi-page TIFF format. The pattern shape inspection at Step S7 is similar to that in the first embodiment, in which the contour to be measured is reconstructed from the pattern contours extracted from the first SEM image and the second SEM image, and the reconstructed contour is measured.

According to this embodiment, as described above, the measuring procedure is more simplified than the first embodiment. The aspect described in this embodiment is effective when the two different SEM images acquired under the same condition of irradiating the sample with the electron beam using different detecting method of the secondary charged particle or the backscattered charged particles are suitable for the reconstruction of the contour to be measured. Use of the first embodiment may be more suitable depending on the shape and the material of the sample to be measured.

What is claimed is:

1. A pattern measuring apparatus that scans a sample with charged particles, forms a detected image by detecting secondary charged particles or backscattered charged particles generated from the sample, and measures a pattern imaged on the detected image, the apparatus comprising:
    an image acquiring section acquiring a plurality of detected images taken at a substantially same location on the sample under different imaging conditions;
    a contour extracting section extracting a plurality of pattern contours from the plurality of detected images;
    a contour reconstructing section reconstructing a contour to be measured by combining the plurality of pattern contours;
    a contour measuring section making a measurement using the reconstructed contour to be measured; and
    an interface simultaneously displaying pattern contours extracted from a plurality of detected images acquired at the substantially same location on the sample, wherein the interface has a contour extracting method setting section.

2. The pattern measuring apparatus according to claim 1, further comprising:
    a position shift detecting section detecting an imaging position shift using a pattern imaged in common among the plurality of detected images, wherein the contour reconstructing section reconstructs the contour to be measured by reflecting the imaging position shift thereon.

3. The pattern measuring apparatus according to claim 2, wherein the position shift detecting section uses a pattern different from the pattern to be measured to detect the imaging position shift.

4. The pattern measuring apparatus according to claim 1, wherein a plurality of images in which the imaging position shifts in the plurality of detected images are corrected are stored as a single piece of data.

5. The pattern measuring apparatus according to claim 1, wherein the sample to be measured is constituted by a plurality of layers, and there are a plurality of patterns to be measured each of which including at least one pattern belonging to a layer different from one another.

6. The pattern measuring apparatus according to claim 1, wherein in the contour reconstructing section, there are a plurality of pattern contours extracted from at least one image.

7. The pattern measuring apparatus of claim 1,
    wherein said different imaging conditions comprise a first imaging condition and a second imaging condition,
    wherein images at all measuring locations on said sample are taken under the first and second imaging conditions,
    wherein said first imaging condition uses 500 V of incident energy of an electron beam, 2 pA of current, and a first scanning speed, and
        wherein said second imaging condition uses 1600 V of incident energy of an electron beam, 16 pA of current, and a second scanning speed that is less than the first scanning speed.

8. A pattern measuring apparatus that scans a sample with charged particles, forms a detected image by detecting secondary charged particles or backscattered charged particles generated from the sample, and measures a pattern imaged on the detected image, the apparatus comprising:
    an image acquiring section acquiring a plurality of detected images taken at a substantially same location on the sample under different detecting conditions;
    a contour extracting section extracting a plurality of pattern contours from the plurality of detected images;
    a contour reconstructing section reconstructing a contour to be measured by combining the plurality of pattern contours;
    a contour measuring section making a measurement using the reconstructed contour to be measured; and
    an interface simultaneously displaying pattern contours extracted from a plurality of detected images acquired at the substantially same location on the sample, wherein the interface has a contour extracting method setting section.

9. The pattern measuring apparatus according to claim 8, wherein the sample to be measured is constituted by a plurality of layers, and there are a plurality of patterns to be measured each of which including at least one pattern belonging to a layer different from one another.

10. The pattern measuring apparatus according to claim 9, wherein in the contour reconstructing section, there are a plurality of pattern contours extracted from at least one image.

11. A pattern measuring method of scanning a sample with charged particles, forming a detected image by detecting secondary charged particles or backscattered charged particles generated from the sample, and measuring a pattern imaged on the detected image, the method comprising the steps of:
acquiring a plurality of detected images taken at a substantially same location on the sample under different imaging conditions;
extracting a plurality of pattern contours from the plurality of detected images;
reconstructing a contour to be measured by combining the plurality of pattern contours;
making a measurement using the reconstructed contour to be measured; and
simultaneously displaying, using an interface having a contour extracting method setting section, pattern contours extracted from a plurality of detected images acquired at the substantially same location on the sample.

12. The pattern measuring method according to claim 11, further comprising the step of:
detecting an imaging position shift using a pattern imaged in common among the plurality of detected images,
wherein the reconstructing the contour to be measured reconstructs the contour to be measured by reflecting the imaging position shift thereon.

13. The pattern measuring method according to claim 12 further comprising the steps of:
determining whether a measurement value is normal or abnormal; and
redoing the detection of the imaging position shift, if the measurement value is abnormal,
wherein the step of reconstructing the contour to be measured reconstructs the contour to be measured by reflecting the redetected imaging position shift thereon.

14. The pattern measuring method according to claim 11, further comprising the step of:
comparing a plurality of extracted contours to make a determination,
wherein if it is determined that the same contour is selected, the extraction of the pattern contour is performed again at the step of extracting a plurality of pattern contours.

15. The pattern measuring method of claim 11,
wherein said different imaging conditions comprise a first imaging condition and a second imaging condition,
wherein images at all measuring locations on said sample are taken under the first and second imaging conditions,
wherein said first imaging condition uses 500 V of incident energy of an electron beam, 2 pA of current, and a first scanning speed, and
wherein said second imaging condition uses 1600 V of incident energy of an electron beam, 16 pA of current, and a second scanning speed that is less than the first scanning speed.

16. A pattern measuring method of scanning a sample with charged particles, forming a detected image by detecting secondary charged particles or backscattered charged particles generated from the sample, and measuring a pattern imaged on the detected image, the method including the steps of:
acquiring a plurality of detected images taken at a substantially same location on the sample under different detecting conditions;
extracting a plurality of pattern contours from the plurality of detected images;
reconstructing a contour to be measured by combining the plurality of pattern contours;
making a measurement using the reconstructed contour to be measured; and
simultaneously displaying, using an interface having a contour extracting method setting section, pattern contours extracted from a plurality of detected images acquired at the substantially same location on the sample.

17. A non-transitory computer-readable recording medium on which a pattern measuring program for causing a computer to execute a measurement of a pattern imaged on a detected image acquired by a charged particle beam device is recorded, the program causes the computer to:
read a plurality of detected images taken at a substantially same location on the sample under different imaging conditions;
extract a plurality of pattern contours from the plurality of detected images;
reconstruct a contour to be measured by combining the plurality of pattern contours;
make a measurement using the reconstructed contour to be measured; and
simultaneously display, using an interface having a contour extracting method setting section, pattern contours extracted from a plurality of detected images acquired at the substantially same location on the sample.

18. The non-transitory computer-readable recording medium on which the pattern measuring program is recorded according to claim 17, the program further causing the computer to:
detect an imaging position shift using a pattern imaged in common among the plurality of detected images, wherein to reconstruct the contour to be measured reconstructs the contour to be measured by reflecting the imaging position shift thereon.

19. The non-transitory computer-readable recording medium on which the pattern measuring program is recorded according to claim 17,
wherein said different imaging conditions comprise a first imaging condition and a second imaging condition,
wherein images at all measuring locations on said sample are taken under the first and second imaging conditions,
wherein said first imaging condition uses 500 V of incident energy of an electron beam, 2 pA of current, and a first scanning speed, and
wherein said second imaging condition uses 1600 V of incident energy of an electron beam, 16 pA of current, and a second scanning speed that is less than the first scanning speed.

* * * * *